United States Patent [19]

Takeshima

[11] Patent Number: 5,448,887
[45] Date of Patent: Sep. 12, 1995

[54] EXHAUST GAS PURIFICATION DEVICE FOR AN ENGINE

[75] Inventor: Shinichi Takeshima, Susono, Japan

[73] Assignee: Toyota Jidosha Kabushiki Kaisha, Toyota, Japan

[21] Appl. No.: 251,821

[22] Filed: May 31, 1994

[30] Foreign Application Priority Data

May 31, 1993 [JP] Japan .................. 5-129513

[51] Int. Cl.⁶ .................. F01N 3/20; F02M 25/06; F02N 3/00
[52] U.S. Cl. .................. 60/278; 60/285; 60/289
[58] Field of Search .................. 60/274, 278, 285, 286, 60/289, 301

[56] References Cited

U.S. PATENT DOCUMENTS

| 5,201,802 | 4/1993 | Hirota | 60/285 |
| 5,209,061 | 5/1993 | Takeshima | 60/285 |
| 5,271,223 | 12/1993 | Hoshi | 60/285 |
| 5,331,809 | 7/1994 | Takeshima et al. | |

FOREIGN PATENT DOCUMENTS

| 503882 | 9/1992 | European Pat. Off. |
| 560991 | 4/1993 | European Pat. Off. |
| 597106 | 4/1993 | European Pat. Off. |
| 3838110 | 5/1990 | Germany |
| 62-97630 | 5/1987 | Japan |
| 62-106826 | 5/1987 | Japan |
| 62-117620 | 5/1987 | Japan |
| 3-135417 | 6/1994 | Japan |
| 93/07363 | 4/1993 | WIPO |
| 93/08383 | 4/1993 | WIPO |

OTHER PUBLICATIONS

NO Removal by Absorption into BA$_O$–CuO Binary Oxides (J. Chem Soc. Chem Commun, pp. 1165–1166).
Formation and Decomposition of BaCuO$_{2.5}$ Prepared from a Mixture of Nitrates (Journal of solid state chemistry pp. 176–179).
NO Removal by Absorption into Ba–Cu–O Binary Oxides (Catalyst vol. 33 No. 2 pp. 87–89).

*Primary Examiner*—Douglas Hart
*Attorney, Agent, or Firm*—Kenyon & Kenyon

[57] ABSTRACT

An exhaust gas purification device of the present invention includes a three-way reducing and oxidizing catalyst disposed on an exhaust passage of an engine, and an NO$_x$ absorbent which absorbs NO$_x$ in the exhaust gas when the air-fuel ratio of the exhaust gas is lean and releases absorbed NO$_x$ when the air-fuel ratio of the exhaust gas is rich; the engine in the present invention is controlled in most of its operating region in such a manner that the operating air-fuel ratio of the engine oscillates between a rich air-fuel ratio and a lean air-fuel ratio about a center value of a stoichiometric air-fuel ratio; when the operating air-fuel ratio of the engine becomes lean, the ability of the three-way catalyst for reducing NO$_x$ in the exhaust gas becomes low, and a part of NO$_x$ in the exhaust gas passes through the three-way catalyst, and, since the air-fuel ratio of the exhaust gas is lean, this NO$_x$ is absorbed in the NO$_x$ absorbent located downstream of the three-way catalyst; when the operating air-fuel ratio of the engine becomes rich, the ability of the three-way catalyst for oxidizing HC and CO in the exhaust gas becomes low, and a part of HC and CO in the exhaust gas passes through the three-day catalyst; since the air-fuel ratio of the exhaust gas is rich, absorbed NO$_x$ is released from the NO$_x$ absorbent and this NO$_x$ is reduced as HC and CO passes through the three-way catalyst; therefore, the pollutants such as HC, CO, NO$_x$ are almost completely removed.

7 Claims, 17 Drawing Sheets

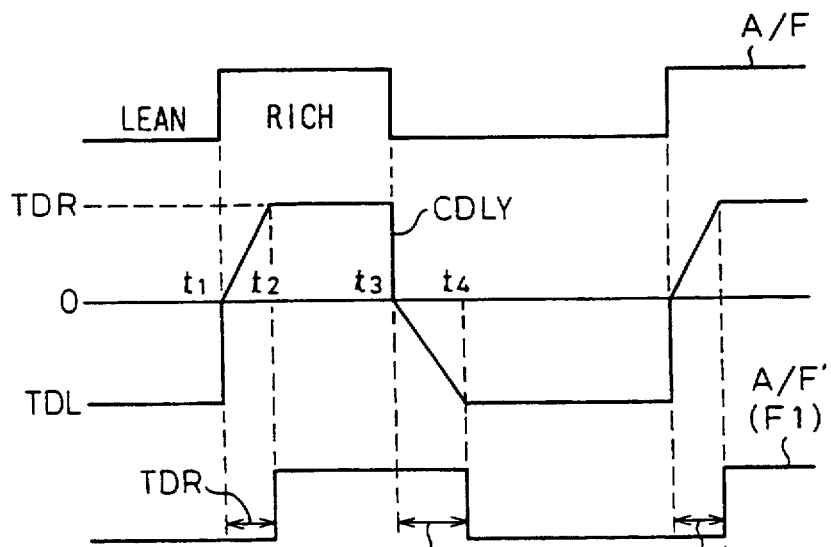
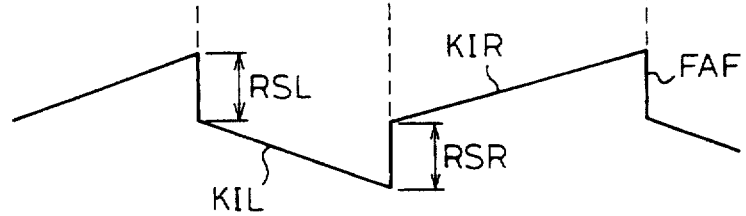

THROTTLE VALVE OPENING TH

ENGINE SPEED Ne

EXHAUST GAS PURIFICATION DEVICE FOR AN ENGINE

BACKGROUND OF THE INVENTION

1. Field of the invention

The present invention relates to an exhaust gas purification device for an engine. More specifically, the present invention relates to a device which is capable of effectively removing an $NO_x$ component from exhaust gas of the engine.

2. Description of the Related Art

An exhaust gas purification device used for engines mainly operated with a lean air-fuel ratio (such as lean burn gasoline engines) to remove an $NO_x$ (nitrogen oxide) components in the exhaust gas is disclosed in WO93-07363. The device utilizes an $NO_x$ absorbent which can absorb an $NO_x$ component in the exhaust gas when the air-fuel ratio of the exhaust gas is lean, and can release absorbed $NO_x$ when the oxygen concentration in the exhaust gas becomes low. In the device disclosed in WO93-07363, the $NO_x$ absorbent is disposed in the exhaust passage of a lean burn engine. Since the air-fuel ratio of the exhaust gas in the most part, lean in the lean burn engine, the $NO_x$ absorbent usually absorbs the $NO_x$ components in the exhaust gas, hence the $NO_x$ component is removed from the exhaust gas. When the amount of the $NO_x$ absorbed in the $NO_x$ absorbent increases, the air-fuel ratio of the engine is lowered to make the air-fuel ratio of the exhaust gas rich. When the air-fuel ratio of the exhaust gas becomes rich, the oxygen concentration in the exhaust gas becomes low and, at the same time, the concentration of HC and CO components in the exhaust gas becomes higher, therefore, $NO_x$ absorbed in the $NO_x$ absorbent is released from the absorbent and reduced to $N_2$ by the HC and CO components in the exhaust gas.

By repeating above procedure during engine operation, the $NO_x$ component in the exhaust gas is almost completely removed by the device in WO93-07363.

As stated above, the $NO_x$ absorbent can absorb $NO_x$ in the exhaust gas when the air-fuel ratio of the exhaust gas is lean. However, it is necessary that an oxygen component exists in the exhaust gas when the $NO_x$ absorbent absorbs $NO_x$ in the exhaust gas. Therefore, when the air-fuel ratio of the exhaust gas is lower than a stoichiometric air-fuel ratio, i.e., when the air-fuel ratio of the exhaust gas is rich, the $NO_x$ absorbent cannot absorb the $NO_x$ in the exhaust gas since the concentration of the oxygen in the exhaust gas is too low.

Therefore, when the exhaust gas purification device of WO93-07363 is applied to engines mainly operated near the stoichiometric air-fuel ratio, such as the engines in which air-fuel ratio oscillates between a rich air-fuel ratio and a lean air-fuel ratio about the stoichiometric air-fuel ratio, the $NO_x$ absorbent cannot absorb $NO_x$ in the exhaust gas when the air-fuel ratio of the engine is rich. Therefore, the $NO_x$ absorbent is not effective as a means for purifying the exhaust gas of such engines.

As the exhaust gas purification device for the engines which are operated near the stoichiometric air-fuel ratio, a three-way reducing and oxidizing catalyst is widely used. The three-way reducing and oxidizing catalyst can remove three pollutants in the exhaust gas, i.e., HC, CO and $NO_x$ simultaneously when the air-fuel ratio of the exhaust gas is near the stoichiometric air-fuel ratio. However, the three-way reducing and oxidizing catalyst can remove these three pollutants in the exhaust gas only when the air-fuel ratio of the exhaust gas is in narrow range around the stoichiometric air-fuel ratio, and the efficiency for removing $NO_x$ in the exhaust gas decreases rapidly as the air-fuel ratio of the exhaust gas becomes lean.

Therefore, when applied to the engines in which the air-fuel ratio oscillates periodically between rich and lean air-fuel ratio about the stoichiometric air-fuel ratio as the center of oscillation, the total capability of three-way catalyst for removing $NO_x$ in the exhaust gas becomes low, because of lower efficiency for removing $NO_x$ during the period in which the air-fuel ratio of the exhaust gas is on the lean air-fuel ratio side.

To compensate for the deficiency of the three-way reducing and oxidizing catalyst in the lean air-fuel ratio region, it is possible to dispose more than two three-way catalysts in series. However even when arranged in such a manner, the ability of the three-way catalysts for purifying $NO_x$ in total does not increase remarkably. The ability of the three-way catalyst for reducing $NO_x$ falls rapidly as the concentration of $NO_x$ in the exhaust gas decreases, since the possibility of the $NO_x$ molecules being reduced on the catalyst becomes lower as the concentration of the $NO_x$ in the exhaust gas becomes lower.

When more than two catalysts are disposed in the exhaust passage in series, the concentration of $NO_x$ in the exhaust gas flowing into the catalysts disposed at downstream side becomes low, since the large part of the $NO_x$ is already removed by the catalyst disposed at upstream side of the exhaust passage. Therefore, the total capability of the catalysts for removing $NO_x$ in the exhaust gas as a total becomes almost the same as the capability of the first catalyst. For example, if two three-way catalysts are disposed in the exhaust passage, 95 percent of the $NO_x$ in the exhaust gas is removed by the first (upstream) catalyst, and due to lower concentration of the $NO_x$ component in the exhaust gas flowing into the second (downstream) catalyst, the ability of the downstream catalyst becomes very low, and total ability of two catalysts becomes almost same value of the ability of the upstream catalyst (e.g., approximately 96 percents).

Therefore, in case of engines which air-fuel ratio oscillates between a rich air-fuel ratio and a lean air-fuel ratio, it is very difficult to effectively remove $NO_x$ in the exhaust gas.

SUMMARY OF THE INVENTION

Therefore, in view of the problems explained above, the object of the present invention is to provide an exhaust purification device which can effectively remove the $NO_x$ component from the exhaust gas of the engine in which the operating air-fuel ratio oscillates between a rich air-fuel ratio and a lean air-fuel ratio about the stoichiometric air-fuel ratio as the center of the oscillation.

According to the present invention, there is provided an exhaust gas purification device for an engine having an inlet air passage and an exhaust passage, said device comprising: an air-fuel ratio controlling means for controlling an operating air-fuel ratio of said engine during a normal operating condition of said engine in such a manner that the air-fuel ratio of the engine oscillates periodically between a rich air-fuel ratio and a lean air-fuel ratio about a stoichiometric air-fuel ratio as the center of the oscillation, a three-way reducing and oxidizing catalyst disposed in said exhaust passage, an $NO_x$ absorbent disposed in said exhaust passage downstream of said three-way catalyst, said $NO_x$ absorbent absorbing an $NO_x$ component in the exhaust gas when the air-fuel ratio of the exhaust gas flowing into said $NO_x$ absorbent is lean, and releasing the absorbed $NO_x$ when an oxygen concentration in the exhaust gas becomes lower.

BRIEF DESCRIPTION OF THE DRAWINGS

The present invention will be better understood from the description as set forth hereinafter, with reference to the accompanying drawings, in which:

FIGS. 6A through 6D are timing diagrams explaining the flow chart of FIGS. 5A and 5B;

DESCRIPTION OF PREFERRED EMBODIMENTS

Figure 1:
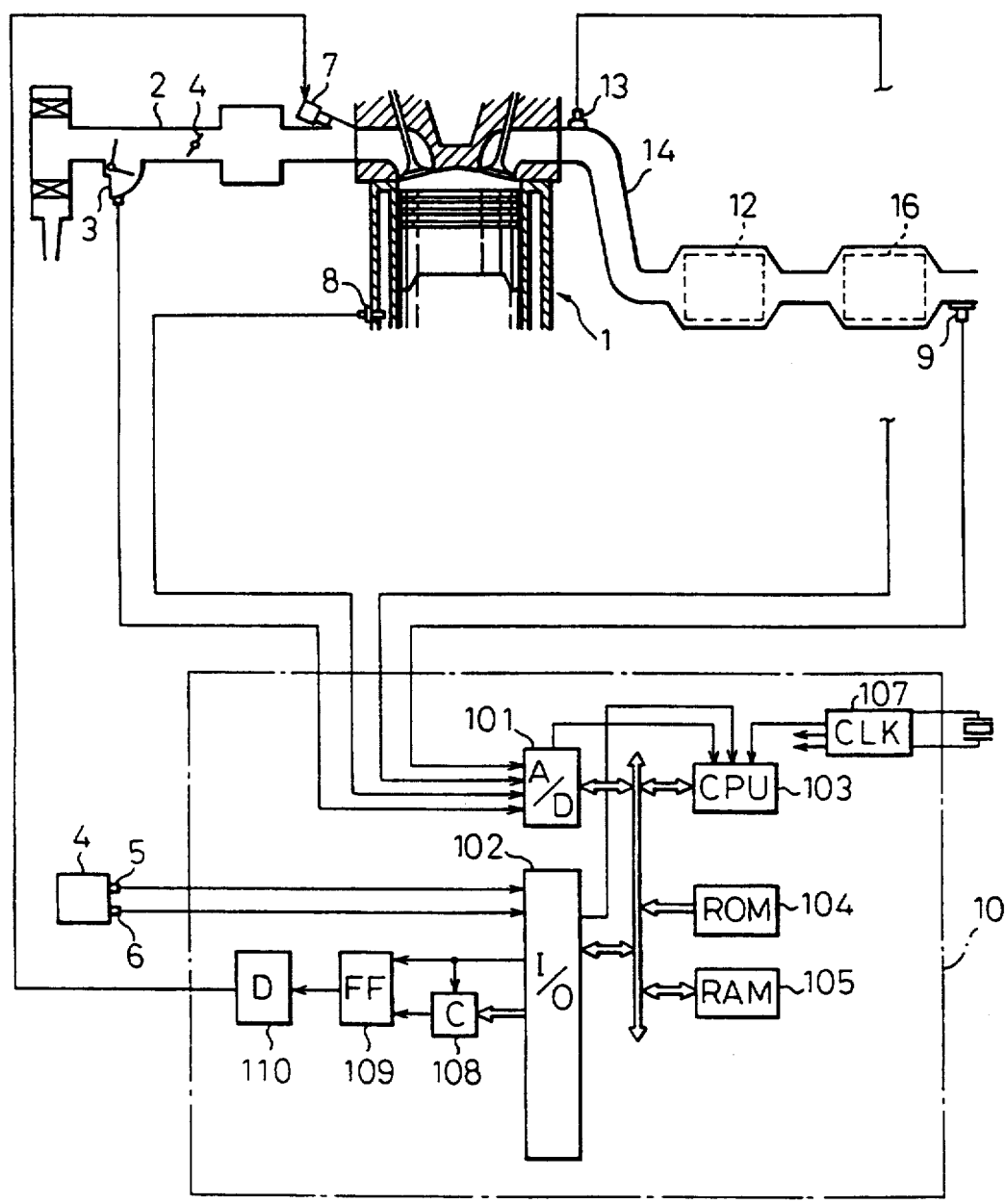
FIG. 1 is a drawing schematically illustrating an engine equipped with an exhaust gas purification device according to an embodiment of the present invention.

FIG. 1 schematically illustrates an embodiment of the exhaust gas purification device according to the present invention.

In FIG. 1, reference numeral 1 represents an internal combustion engine for an automobile and 2 represents an inlet air passage of the engine 1. The air inlet passage 2 is provided with a throttle valve 4 and an airflow meter 3. The airflow meter 3 is a potentiometer-type which generates an analog voltage signal proportional to the amount of air flowing therethrough and drawn into the engine 1. The signal from the airflow meter 3 is transmitted to a multiplexer-incorporating analog-to-digital (A/D) converter 101 of the control circuit 10.

Crank angle sensors 5 and 6, for detecting the angle of the crankshaft (not shown) of the engine 1, are disposed at a distributor 4.

In this embodiment, the crank angle sensor 5 generates a pulse signal at every 720 degrees crank angle (CA) and the crank angle sensor 6 generates a pulse signal at every 30 degrees CA. The pulse signals from the crank angle sensors 5 and 6 are supplied to an input-/output (I/O) interface 102 of the control circuit 10. Further, the pulse signal of the crank angle sensor 6 is then supplied to an interruption terminal of a central processing unit (CPU) 103.

In the inlet passage 2, a fuel injection valve 7 is provided at an inlet port of each cylinder of the engine 1, for supplying pressurized fuel from the fuel system to the cylinders of the engine.

Numeral 14 in FIG. 1 designates an exhaust passage of the engine 1. In the exhaust passage 14, an $O_2$ sensor 13 which generates a voltage signal corresponding to the concentration of the oxygen component in the exhaust gas, and a three-way reducing and oxidizing catalyst 12 which reduces the $NO_x$ component and oxidizing HC and CO components in the exhaust gas when the air-fuel ratio of the exhaust gas is stoichiometric, and an $NO_x$ absorbent 16 which absorbs $NO_x$ in the exhaust gas when the air-fuel ratio of the exhaust gas is lean and releases the absorbed $NO_x$ when the concentration of the oxygen in the exhaust gas is lowered, are disposed in this order, from the upstream side, in the exhaust passage 14.

Figure 7:
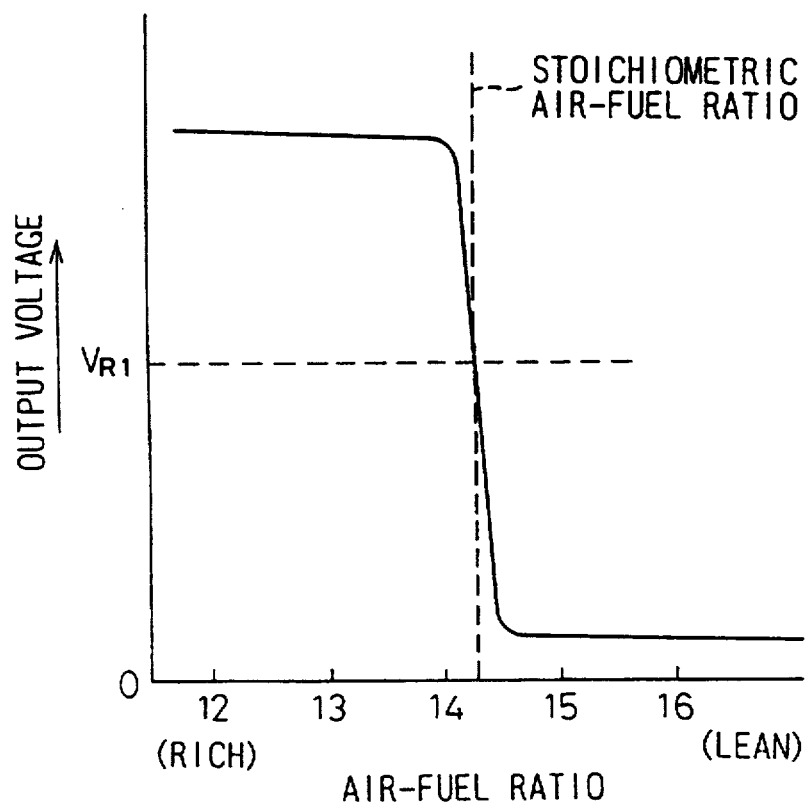
FIG. 7 shows a output signal characteristic curve of the $O_2$ sensors.

The $O_2$ sensor 13 detects the partial pressure of oxygen in the exhaust gas. Since the concentration of the oxygen in the exhaust gas changes drastically at the stoichiometric air-fuel ratio, the $O_2$ sensor 13 generates different voltage signals in accordance with whether the air-fuel ratio of the exhaust gas is lean or rich, as shown in FIG. 7. Therefore, from the output voltage signal VOM of the $O_2$ sensor 13, it is possible to determine accurately whether the air-fuel ratio of the exhaust gas is lean or rich compared to the stoichiometric air-fuel ratio.

In this embodiment, the output VOM of the $O_2$ sensor 13 is supplied to the input/output interface 102 of the control circuit 10, via the A/D converter 101, to control the air-fuel ratio of the engine 1 as explained later.

A coolant temperature sensor 8 for detecting the temperature of the coolant is disposed in a water jacket of a cylinder block of the engine 1. The coolant temperature sensor 8 generates an analog voltage signal in response to the temperature THW of the coolant, and transmits this signal to the A/D converter 101 of the control circuit 10. An exhaust gas temperature sensor 9 is disposed in the exhaust passage 14 downstream of the $NO_x$ absorbent 16. The output voltage signal of the exhaust temperature sensor 14, which corresponding to the temperature TEX of the exhaust gas from the $NO_x$ absorbent, is fed to the input/output interface 102 of the control circuit 10 via the A/D converter 101.

The control circuit 10, which may be Constructed by a microcomputer, further comprises a central processing unit (CPU) 103, a read-only-memory (ROM) 104 for storing a main routine and interrupt routines such as a fuel injection routine, and an ignition timing routine as well as constants used in the routines, etc., a random-access-memory (RAM) 105 for storing temporary data, and a clock generator 107 for generating various clock signals.

A down counter 108, a flip-flop 109, and a drive circuit 110 are provided in the control circuit 10 for controlling the fuel injection valve 7.

When a fuel injection amount TAU is calculated in a routine, as explained later, the amount TAU is preset in the down counter 108, and simultaneously, the flip-flop 109 is set, and as a result, the drive circuit 110 initiates the activation of the fuel injection valve 7. On the other hand, the down counter 108 counts up the clock signal from the clock generator 107, and finally, a logic "1" signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders. Interruptions occur at the CPU 103 when the A/D converter 101 completes an A/D conversion and generates an interrupt signal; when the crank angle sensor 6 generates a pulse signal; and when the clock generator 107 generates a special clock signal.

The inlet air amount data Q from the airflow meter 3 and the coolant temperature data THW from the coolant sensor 8 as well as the exhaust temperature data TEX from the exhaust gas temperature sensor 9 are fetched by A/D conversion routines executed at predetermined intervals, and then stored in the RAM 105; i.e., the data Q, THW and TEX in the RAM 105 are updated at predetermined intervals. The engine speed Ne is calculated by an interruption routine executed every 30 degrees of crank angle, i.e., at every pulse signal of the crank angle sensor 6, and is stored in the RAM 105.

Figure 2:
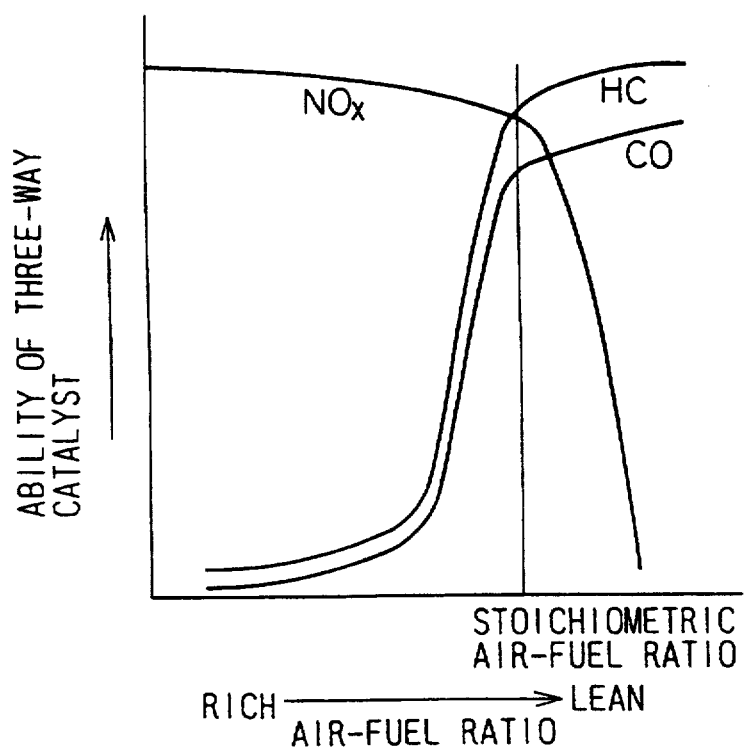
FIG. 2 is a graph showing an example of the change in the ability of the three-way catalyst for purify HC, CO and $NO_x$ in accordance with the air-fuel ratio of the exhaust gas.

The three-way catalyst 12 uses, for example, alumina as a carrier, and on this carrier, precious metals such as platinum Pt, rhodium Rh, and palladium Pd are carried. As shown in FIG. 2, the three-way catalyst 12 removes three pollutant in the exhaust gas, i.e., $NO_x$, HC, and CO at the same time by reducing $NO_x$ and oxidizing HC and CO, when the air-fuel ratio of the exhaust gas is the stoichiometric air-fuel ratio. However, when the air-fuel ratio of the exhaust gas becomes rich compared to the stoichiometric air-fuel ratio, the ability of the three-way catalyst for oxidizing HC and CO becomes low, and when the air-fuel ratio of the exhaust gas becomes lean compared to the stoichiometric air-fuel ratio, the ability of the three-way catalyst for reducing $NO_x$ becomes low, and the rate of decrease in the ability for reducing $NO_x$ when the air-fuel ratio is lean is more rapid than the rate of decrease in the ability of oxidizing HC and CO when the air-fuel ratio is rich. Therefore, when the air-fuel ratio of the exhaust gas periodically swings between rich and lean under the air-fuel ratio control, as explained later, the purification of the $NO_x$ by the three-way catalyst becomes insufficient when the air-fuel ratio is lean.

Further, when the concentration of $NO_x$ in the exhaust gas becomes low, the ability of the three-way catalyst to purify $NO_x$ in the exhaust gas becomes low since the possibility of the $NO_x$ molecules in the exhaust gas being reduced on the catalyst becomes lower as the concentration of the $NO_x$ in the exhaust gas becomes lower. Therefore, as explained before, even if two catalysts are disposed in the exhaust passage in series, the ability of the catalyst disposed downstream becomes very low since a large part of $NO_x$ in the exhaust gas is already removed before flowing into the downstream catalyst by the upstream catalyst, and the concentration of $NO_x$ in the exhaust gas flowing into the down stream catalyst becomes low. Thus, it is difficult to increase the ability of the catalyst for removing $NO_x$ in the exhaust gas by using two three-way catalysts in series when the air-fuel ratio of the exhaust gas is lean.

In this embodiment, the $NO_x$ absorbent 16 is disposed in the exhaust passage downstream of the three-way catalyst to increase the total ability of the exhaust gas purification device for removing $NO_x$ from the lean air-fuel ratio exhaust gas.

The $NO_x$ absorbent 16 in this embodiment uses, for example, alumina as a carrier, and on this carrier, precious metals such as platinum, and at least one substance selected from alkali metals such as potassium K, sodium Na, lithium Li and cesium Cs; alkali-earth metals such as barium Ba and calcium Ca; and rare-earth metals such as lanthanum La and yttrium Y are carried. The $NO_x$ absorbent 16 absorbs $NO_x$ in the inflowing exhaust gas when the air-fuel ratio of the exhaust gas is lean, and releases the absorbed $NO_x$ when the oxygen concentration of the inflowing exhaust gas becomes lower.

In this specification, the term "air-fuel ratio of the exhaust gas" means a ratio of the air and the fuel which are supplied to the engine or exhaust passages upstream of the $NO_x$ absorbent. Therefore, when no air and fuel is supplied in the exhaust passage upstream of the $NO_x$ absorbent 16, the air-fuel ratio of the exhaust gas becomes the same as the operating air-fuel ratio of the engine (i.e., the air-fuel ratio of the air-fuel mixture supplied to combustion chambers of the engine).

In this embodiment, the air-fuel ratio of the engine is controlled in such manner that the air-fuel ratio of the engine oscillates periodically between a rich air-fuel ratio and a lean air-fuel ratio about the stoichiometric air-fuel ratio. Therefore, when the operating air-fuel ratio of the engine swings to the lean air-fuel ratio side, and the air-fuel ratio of the exhaust gas inflowing to the $NO_x$ absorbent 16 becomes lean, the $NO_x$ absorbent 16 absorbs $NO_x$ in the exhaust gas which is not removed by the three-way catalyst 12 disposed upstream of the $NO_x$ absorbent 16. Also, when the air-fuel ratio of the engine swings to the rich air-fuel ratio side, and the oxygen concentration in the exhaust gas flowing into the $NO_x$ absorbent 16 becomes low, the $NO_x$ absorbent 16 releases the absorbed $NO_x$.

Figure 3A:
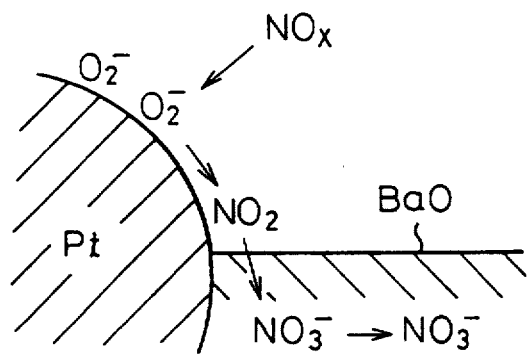
FIG. 3A and 3B are views for explaining the absorbing and releasing operation of $NO_x$ of the $NO_x$ absorbent
Figure 3B:
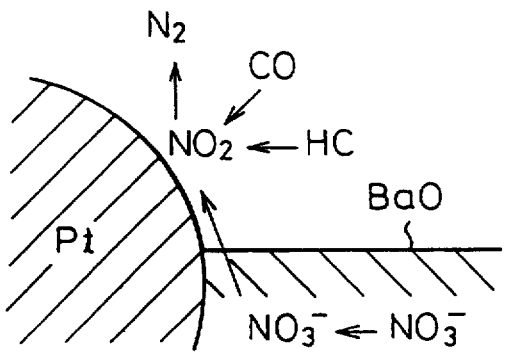

When the $NO_x$ absorbent is disposed in the exhaust passage of the engine, the $NO_x$ absorbent actually performs the above-mentioned absorption and releasing operation of $NO_x$. Though the mechanism of this absorption and releasing operation of the $NO_x$ absorbent is not clear, it is considered that the absorption and releasing operation is conducted by the mechanism shown in FIGS. 3A and B. FIGS. 3A and 3B explain the mechanism of the absorption and the releasing operation in the case where platinum Pt and barium Ba are carried on the carrier, as an example, but it is considered that a similar mechanism is also applied even if other precious metal, alkali metals, alkali earth metals, or rare earth metals are used.

Namely, when the air-fuel ratio of the inflowing exhaust gas is lean, the concentration of oxygen in the exhaust gas becomes quite high. In this case, as shown in FIG. 3A, the oxygen $O_2$ is deposited on the surface of platinum Pt in the form of $O_2^-$ or $O^{2-}$. The NO in the inflowing exhaust gas reacts with $O_2^-$ or $O^{2-}$ on the surface of the platinum Pt and becomes $NO_2$ ($2NO + O_2 \rightarrow 2NO_2$). Then, a part of the produced $NO_2$ is oxidized on the platinum Pt and absorbed into the $NO_x$ absorbent. While bonding with the barium oxide BaO, it is diffused in the absorbent in the form of nitric acid ions $NO_3^-$ as shown in FIG. 3A. In this way, $NO_x$ is absorbed in the $NO_x$ absorbent.

As long as the oxygen concentration in the inflowing exhaust gas is high, the $NO_x$ is produced on the surface of the platinum Pt, and as long as the $NO_x$ is produced on the surface of the platinum Pt, and as long as the $NO_x$ absorption capacity of the absorbent is not saturated, the $NO_x$ is absorbed into the $NO_x$ absorbent and nitric acid ions $NO_3^-$ are produced.

On the other hand, when the oxygen concentration in the inflowing exhaust gas is lowered, the production of $NO_2$ is lowered and the reaction proceeds in an inverse direction ($NO_3^- \rightarrow NO_2$), and thus nitric acid ions $NO_3^-$ in the absorbent are released in the form of $NO_2$ from the $NO_x$ absorbent.

In this case, if the components such as HC, CO, exist in the exhaust gas, these components react with the oxygen $O_2^-$ or $O^{2-}$ on the platinum Pt and are oxidized. After oxygen $O_2^-$ or $O^{2-}$ on the platinum Pt are consumed by HC, CO in the exhaust gas, if HC and CO components still remain in the exhaust gas, $NO_x$ released from the $NO_x$ absorbent as well as $NO_x$ emitted from the engine are reduced by the HC and CO remaining on the platinum Pt. This oxidation of the HC and CO consumes the oxygen component existing near the $NO_x$ absorbent, and the concentration of oxygen in the atmosphere around the $NO_x$ absorbent is lowered. Also, the $NO_2$ released from the $NO_x$ absorbent reacts with the HC and CO in the exhaust gas as shown in FIG. 3B and reduced to $N_2$. In this way, when the $NO_2$ on the surface of the platinum Pt reacts with HC and CO in the reducing agent, and when the $NO_2$ no longer exists on the surface of the platinum Pt, the $NO_2$ is successively released from the absorbent. Accordingly, when HC and CO components exist in the inflowing exhaust gas, the $NO_x$ is released from $NO_x$ absorbent and quickly reduced to $N_2$.

Namely, the HC and CO component in the exhaust gas immediately react with the $O_2^-$ or $O^{2-}$ on the platinum Pt and are oxidized, and subsequently if the HC and CO still remain after the $O_2^-$ or $O^{2-}$ on the platinum Pt are consumed, the $NO_x$ released from the absorbent and the $NO_x$ emitted from the engine are reduced.

Thus the $NO_x$ absorbent absorbs the low concentration of $NO_x$ in the exhaust gas when the air-fuel ratio of the exhaust gas is lean, and releases absorbed $NO_x$ in a condensed form when the oxygen concentration of the exhaust gas is lowered, i.e., the $NO_x$ absorbent absorbs $NO_x$ at a low concentration and releases absorbed $NO_x$ in a relatively high concentration. Since the concentration of the $NO_x$ released from the $NO_x$ absorbent is relatively high, the released $NO_x$ can be almost completely reduced to $N_2$ by the HC and CO in the exhaust gas. In this way, the $NO_x$ absorbent can remove low concentration $NO_x$ in the exhaust gas quite effectively.

Next, the operation of the $NO_x$ absorbent when it is disposed downstream of the three-way catalyst is explained.

In this embodiment, the operating air-fuel ratio of the engine oscillates between rich air-fuel ratio and lean air-fuel ratio around the stoichiometric air-fuel ratio, and the air-fuel ratio of the exhaust gas also oscillates between rich air fuel ratio and lean air fuel ratio accordingly.

During the oscillation, the concentration of the oxygen in the exhaust gas increases drastically when the operating air-fuel ratio of the engine becomes lean compared to the stoichiometric air-fuel ratio. That is, in the period in which the operating air-fuel ratio of the engine is controlled to be on the lean air-fuel ratio side, the exhaust gas flowing into three-way catalyst 12 has a high oxygen concentration and contains a relatively large amount of $NO_x$. As explained in FIG. 2, when the operating air-fuel ratio of the engine is controlled on lean air-fuel ratio side, the ability of the three-way catalyst 12 for reducing $NO_x$ in the exhaust gas falls rapidly, although the ability for oxidizing HC, CO is maintained at high level. Accordingly, a part of the $NO_x$ discharged from the engine passes through the three-way catalyst 12 without being oxidized, even though the HC and CO discharged from the engine are almost completely oxidized and removed from the exhaust gas by the three-way catalyst 12. In this case, the exhaust gas flowing into the $NO_x$ absorbent 16 downstream of the three-way catalyst 12 is lean and contains a relatively small amount of $NO_x$. Therefore, the $NO_x$ absorbent 16 absorbs almost all of $NO_x$ in the exhaust gas, and the $NO_x$ is almost completely removed from the exhaust gas passing through the $NO_x$ absorbent 16.

Next, when the operating air-fuel ratio is controlled on the rich aide compared to the stoichiometric air-fuel ratio, the oxygen concentration in the exhaust gas falls rapidly. Also, in this operating condition, the amount of $NO_x$ generated by the engine becomes relatively small, and the amount of HC and CO generated by the engine increases. Accordingly, the exhaust gas flowing into the three-way catalyst becomes rich and the concentration of HC and CO therein becomes relatively high. As shown in FIG. 2, when the air-fuel ratio of the exhaust gas flowing into the three-way catalyst 12 becomes rich, the ability of the three-way catalyst 12 for oxidizing HC and CO decreases rapidly, although the ability for removing $NO_x$ is maintained at high level. Therefore, HC and CO components in the exhaust gas passes through the three-way catalyst without being purified by the three-way catalyst. In this case, the exhaust gas having a low air-fuel ratio and containing a relatively large amount of HC and CO component flows into the $NO_x$ absorbent 16 disposed downstream of the three-way catalyst Thus, from the $NO_x$ absorbent, the absorbed $NO_x$ is released, and is reduced by consuming HC and CO in the inflowing exhaust gas. The exhaust gas flowing into the $NO_x$ absorbent contains a small amount of the $NO_x$ which passed through the upstream three-way catalyst, but this $NO_x$ is also reduced by the $NO_x$ absorbent using the HC and CO in the exhaust gas. Therefore, the exhaust gas passing through the $NO_x$ absorbent does not contain the $NO_x$ component. Namely, when the operating air-fuel ratio of the engine is controlled on the lean side, the $NO_x$ absorbent absorbs and accumulates the low concentration $NO_x$ passing through the three-way catalyst, and releases this $NO_x$ in condensed form when the operating air-fuel ratio of the engine is rich, so that the $NO_x$ is reduced by the HC and CO components in the exhaust gas.

Therefore, by disposing the $NO_x$ absorbent 16 at downstream of the three-way catalyst 12, the ability for purifying $NO_x$ can be increased in total.

Next, a method for controlling the air-fuel ratio of the engine in this embodiment is explained.

Figure 4:
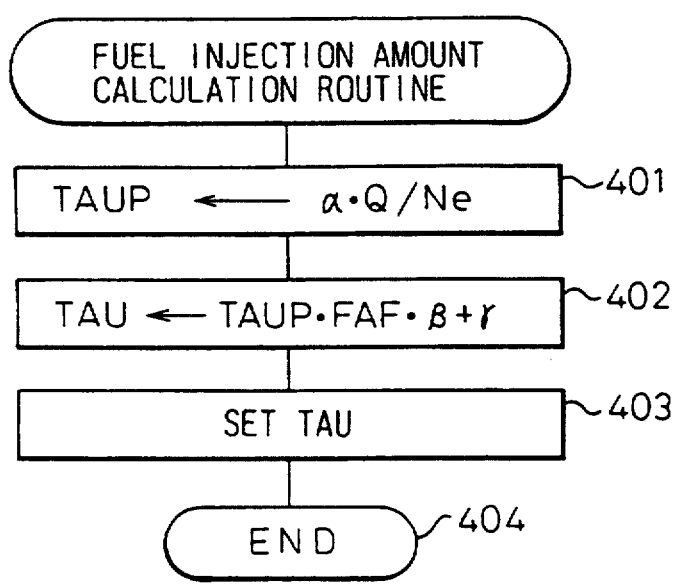
FIG. 4 is a flow chart showing a calculation of the fuel injection amount.

FIG. 4 shows a routine for calculating the fuel injection amount executed by the control circuit 10 in FIG.

1. This routine is performed at a predetermined point in the rotation of the crankshaft, such as 360 degrees.

When the routine starts, at step 401, the amount of the inlet air flow data Q and the engine speed data Ne are read from the RAM 105, and a basic fuel injection amount TAUP is calculated in accordance with the amount of the inlet air per one revolution of the engine, Q/Ne, by $$TAUP = \alpha \times (Q/Ne).$$

where, TAUP is the fuel injection amount required to obtain the stoichiometric air-fuel ratio and $\alpha$ is a predetermined constant.

Then, at step 402, a fuel injection amount TAU is calculated by, $$TAU = TAUP \times FAF \times \beta + \gamma$$

where, $\beta$ and $\gamma$ are correction factors determined by operating conditions of the engine. The calculated TAU is set into the down counter 108 and a flip-flop 109 is set at step 403, whereby fuel injection is started.

As stated before, when the time corresponding to TAU has lapsed, the flip-flop 109 is reset by the signal from the down counter 108, whereby the fuel injection is terminated.

Figure 5A:
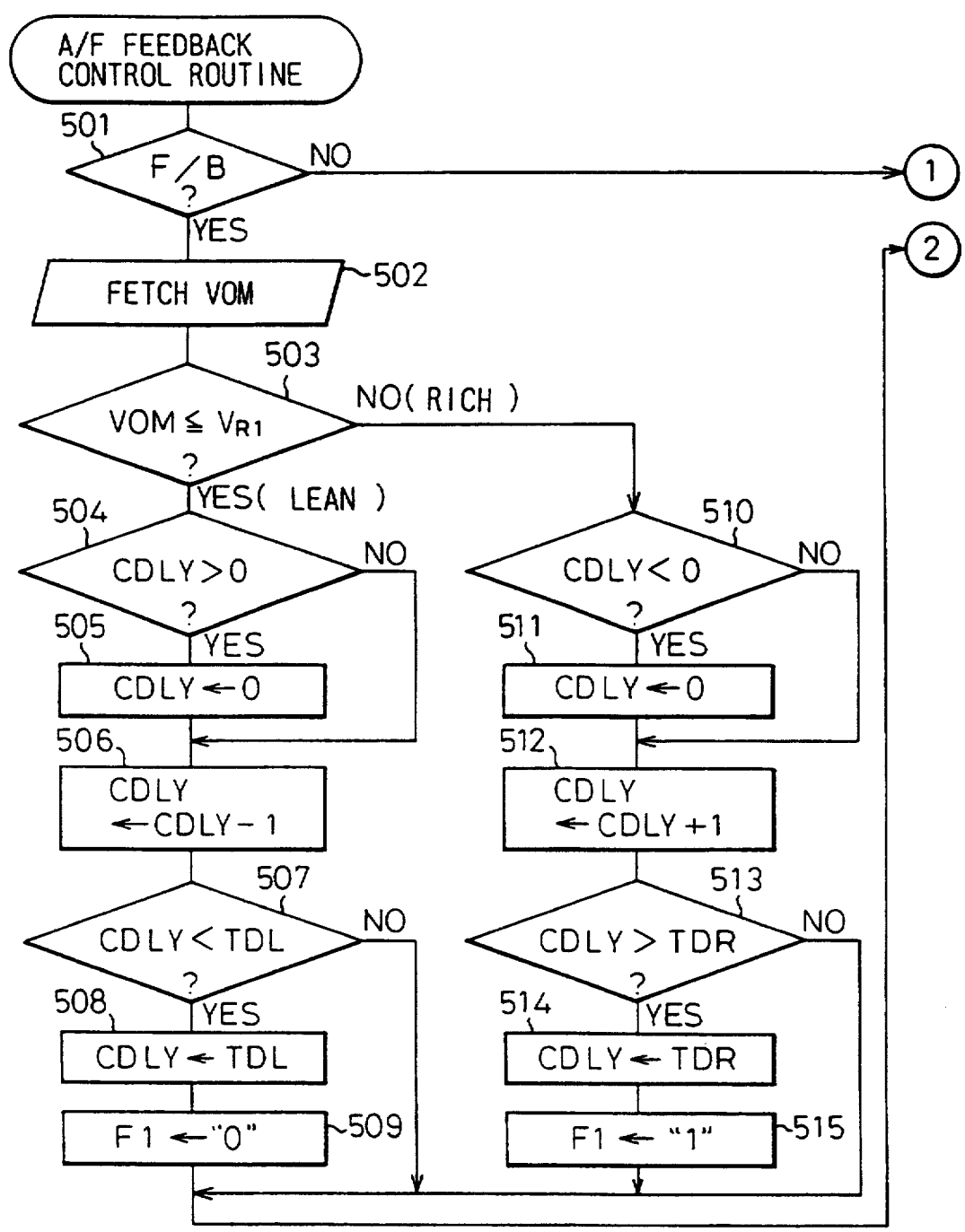
FIGS. 5A and 5B are a flow chart showing an embodiment of the air-fuel ratio control according to the present invention.
Figure 5B:
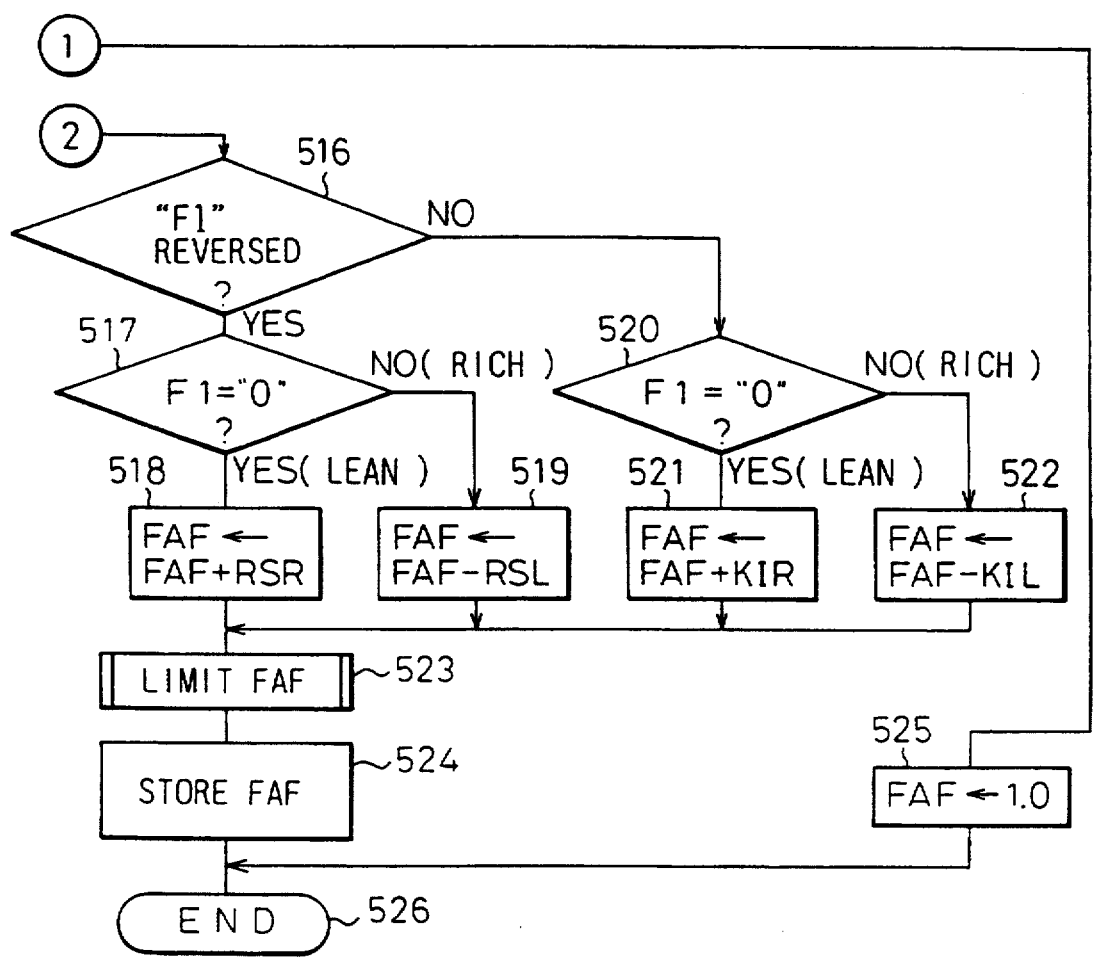

FIGS. 5A and 5B show a routine of a feedback control of the operating air-fuel ratio of the engine 1. This routine calculates an air-fuel ratio correction factor FAF in accordance with the output VOM of the upstream $O_2$ sensor 13, and is performed by the control circuit 10 at predetermined intervals of, e.g., 4 ms.

At step 501 in FIG. 5A, it is determined whether or not all conditions for air-fuel ratio feedback control are satisfied. The conditions for a feedback control are, for example, the engine is not being started,
the coolant temperature is higher than a predetermined value,
fuel increments, such as a start-up fuel increment, a warming-up fuel increment, a power fuel increment, or an OTP fuel increment for preventing an excess rise in the temperature of the catalytic converters, are not being carried out,
the outputs of the upstream $O_2$ sensor 13 have been reversed (i.e., changed from a rich air-fuel ratio output signal to a lean air-fuel ratio output signal or vice versa) at least once,
a fuel cut operation is not being carried out.

If any one of these conditions is not satisfied, the routine proceeds to step 525 in FIG. 5B, which causes an air-fuel ratio correction factor FAF to be 1.0, and the routine terminates at step 526 in FIG. 5B.

If all of the conditions for the air-fuel ratio feedback control are satisfied at step 501, the routine proceeds to step 502.

At step 502, an A/D conversion is performed upon receiving the output voltage VOM of the upstream $O_2$ sensor 13, and the A/D converted value thereof is then fetched from the A/D converter 101. Then, at step 503, the voltage VOM is compared with a reference voltage $V_{R1}$ to thereby determine whether the current air-fuel ratio detected by the upstream $O_2$ sensor 13 is on the rich side or on the lean side with respect to the stoichiometric air-fuel ratio. The reference voltage $V_{R1}$ is usually set at or near the central value of the maximum amplitude of the output of the $O_2$ sensor and, in this embodiment, $V_{R1}$ is set at 0.45 V.

If $VOM \leq V_{R1}$, which means that the current air-fuel ratio is lean, the control proceeds to step 504, at which it is determined whether or not the value of a delay counter CDLY is positive. If CDLY>0, the control proceeds to step 505, which clears the delay counter CDLY, and then proceeds to step 506. At step 506, the delay counter CDLY is counted down by 1, and at step 507, it is determined whether or not CDLY<TDL. Note that TDL is a lean delay time for which a rich state is maintained even after the output of the upstream $O_2$ sensor 13 is changed from the rich side to the lean side, and is defined by a negative value. Therefore, at step 507, only when CDLY<TDL does the control proceed to step 508, which causes CDLY to be set to TDL, and then to step 509, which causes an air-fuel ratio flag F1 to be set to "0" (lean state). On the other hand, if $VOM > V_{R1}$, which means current air-fuel ratio is rich, the control proceeds to step 510, which determines whether or not the value of the delay counter CDLY is negative. If CDLY<0, the control proceeds to step 511, which clears the delay counter CDLY, and then proceeds to step 512. If CDLY$\geq$0, the control directly proceeds to step 512. At step 512, the delay counter CDLY is counted up by 1, and at step 513, it is determined whether or not CDLY>TDR. Note that TDR is a rich delay time for which a lean state is maintained even after the output of the upstream $O_2$ sensor 13 is changed from the lean side to the rich side, and is defined by a positive value. Therefore, at step 513, only when CDLY>TDR does the control proceed to step 514, which causes CDLY to be set to TDR, and then proceeds to step 515, which causes an air-fuel ratio flag F1 to be set to "1" (rich state).

Then, at step 516 in FIG. 5B, it is determined whether or not the air-fuel ratio flag F1 is reversed, i.e., whether or not the delayed air-fuel ratio detected by the upstream. $O_2$ sensor 13 is reversed. If the air-fuel ratio flag F1 is reversed, the control proceeds to steps 517 to 519, and a skip operation is carried out. That is, if the flag F1 is "0" (lean) at step 517, the control proceeds to step 518, which increases the correction factor FAF by a skip amount RSR.

If the flag F1 is "1" (rich) at step 517, the control proceeds to step 519, which reduces the correction factor FAF by a skip amount RSL. On the other hand, if the air-fuel ratio flag F1 is not reversed at step 516, the control proceeds to steps 520 to 522, which carry out an integration operation. That is, if the flag F1 is "0" (lean) at step 520, the control proceeds to step 521, which gradually increases the correction factor FAF by a rich integration amount KIR. Also, if the flag F1 is "1" (rich) at step 520, the control proceeds to step 522, which gradually decreases the correction factor FAF by a lean integration amount KIL.

Then, at step 523, the air-fuel ratio correction factor FAF is restricted, for example, to a minimum value of 0.8 and by a maximum value of 1.2, to thereby prevent the controlled air-fuel ratio from becoming over-rich or over-lean.

Then, at step 524, the correction factor FAF is stored in the RAM 105 and the routine terminates at step 526.

The control operation according to the flow charts of FIGS. 5A and 5B are further explained with reference to FIGS. 6A through 6D, which illustrate the changes in the FAF and other parameters when the control in FIGS. 5A and 5B is performed. As illustrated in FIG.

6A, when the air-fuel ratio signal A/F is obtained by the output of the upstream $O_2$ sensor 13, the delay counter CDLY is counted up when in a rich state, and is counted down when in a lean state, as illustrated in FIG. 6B. As a result, a delayed air-fuel ratio corresponding to the air-fuel ratio flag F1 is obtained as illustrated in FIG. 6C. For example, at time t1, even when the air-fuel ratio A/F is changed from the lean side to the rich side, the delayed air-fuel ratio A/F (F1) is changed at time t2 after the rich delay time TDR. Similarly, at time t3, even when the air-fuel ratio A/F is changed from the rich side to the lean side, the delayed air-fuel ratio A/F (F1) is changed at time t4 after the lean delay time TDL. At time t5, t6, or t7, however, when the air-fuel ratio A/F is reversed in a shorter time than the rich delay time TDR or the lean delay time TDL, the delayed air-fuel ratio F1 is reversed at time t8. That is, the delayed air-fuel ratio A/F (F1) is stable when compared with the air-fuel ratio A/F. Further, as illustrated in FIG. 6D, at every change of the delayed air-fuel ratio F1 from the rich side to the lean side, or vice versa, the correction factor FAF is skipped by the skip amount RSR or RSL, and the correction factor FAF is gradually increased or reduced in accordance with the delayed air-fuel ratio F1.

By the routine explained in FIGS. 5A and 5B, the operating air-fuel ratio of the engine oscillates periodically between the rich air-fuel ratio and the lean air-fuel ratio about the stoichiometric air-fuel ratio. Thus, the pollutants in the exhaust gas such as $NO_x$ as well as HC, CO are effectively purified by the combination of the three-way catalyst 12 and $NO_x$ absorbent 16.

Next, another embodiment of the air-fuel ratio control in which the ability of the $NO_x$ absorbent 16 to purify $NO_x$ in the exhaust gas can be increased, is explained.

As seen from FIGS. 6A through 6D, in the embodiment shown in FIGS. 5A and 5B, the length of the period in which the operating air-fuel ratio of the engine is controlled on the rich side is determined by the values of the rich delay time TDR and the lean skip amount RSL, and the lean integration amount KIL. Similarly, the length of the period in which the operating air-fuel ratio of the engine is controlled on the lean side is determined by the values of the lean delay time TDL and the rich skip amount RSR, and the rich integration amount KIR. Therefore, it is possible to adjust the length of the period of the oscillation of the operating air-fuel ratio of the engine at desired value by changing the value of the parameters such as TDR, RSL, KIL, or TDL, RSR, KIR.

As explained before, the $NO_x$ absorbent 16 absorbs $NO_x$ in the exhaust gas when the operating air-fuel ratio of the engine is controlled on the lean side, and releases $NO_x$ when the air-fuel ratio of the engine is controlled on the rich side. Therefore, the length of the period in which the air-fuel ratio of the engine is controlled on the rich side must be sufficient to allow the $NO_x$ absorbent to release all of the $NO_x$ absorbed in the $NO_x$ absorbent. If the length of the rich air-fuel ratio period is not sufficient, the $NO_x$ absorbent 16 has to start absorbing $NO_x$ in the exhaust gas before the absorbed $NO_x$ is released completely. This causes the amount of the $NO_x$ in the $NO_x$ absorbent to gradually increase with time. Thus, the ability of the $NO_x$ absorbent decreases gradually if the length of the rich air-fuel ratio period is not sufficient.

On the other hand, if the rich air-fuel ratio period lasts too long, rich air-fuel ratio exhaust gas flows into the $NO_x$ absorbent even after the $NO_x$ in the absorbent is completely released. In this case, since the $NO_x$ is not released any more, the HC and CO components in the rich air-fuel exhaust gas pass through the $NO_x$ absorbent without being consumed. Thus, the emission of HC and CO increases.

Further, in the actual operation, the amount of the $NO_x$ released from the $NO_x$ absorbent (i.e., releasing rate of the $NO_x$) changes in accordance with the temperature of the $NO_x$ absorbent. Namely, the suitable length for rich air-fuel ratio period must be determined in accordance with the temperature of the $NO_x$ absorbent.

Figure 8:
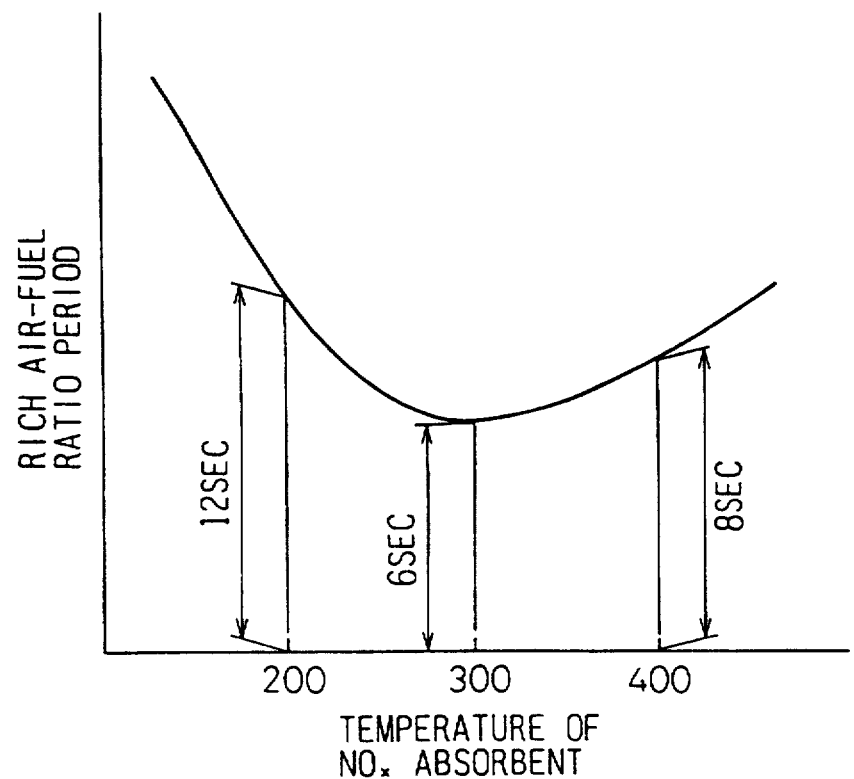
FIG. 8 shows the relationship between the temperature of the $NO_x$ absorbent and required rich air-fuel ratio period.

FIG. 8 shows an example of relationship between the temperature of the $NO_x$ absorbent and the optimum length for rich air-fuel ratio period. As seen from FIG. 8, the releasing rate of $NO_x$ increases as the temperature becomes higher, when the temperature of the $NO_x$ absorbent is lower than a certain value (300° C., in FIG. 8) and decreases as the temperature becomes higher when the temperature of the $NO_x$ absorbent exceeds that temperature. The reason why the releasing rate of $NO_x$ decreases is, that the time required to consume the oxygen on the platinum Pt becomes longer when the temperature exceeds this temperature.

Therefore, if the length of the rich air-fuel ratio period is maintained constant regardless of the temperature of the $NO_x$ absorbent, the ability of the $NO_x$ absorbent to purify the exhaust gas becomes lower.

In order to prevent this problem from occurring, the length of the rich air-fuel ratio period is adjusted in accordance with the temperature of the $NO_x$ absorbent in the embodiment as explained below.

In this embodiment, the oscillation of the operating air-fuel ratio of the engine is controlled in such a manner that the length of the rich air-fuel ratio period changes in accordance with the temperature of the $NO_x$ absorbent, more specifically, the length of the rich air-fuel ratio period is controlled as shown in FIG. 8.

In order to adjust the length of the rich air-fuel ratio period, the value of the rich delay time TDR (FIG. 5A, FIG. 6C) is changed according to the temperature of the $NO_x$ absorbent 16. It will be understood from FIG. 6A through 6D, that the length of the rich air-fuel ratio period is solely determined by the value of the lean delay time TDL, provided that the values of the lean delay time TDL, skip amounts RSR and RSL, as well as integration amounts KIR, KIL are maintained constant.

Figure 9:
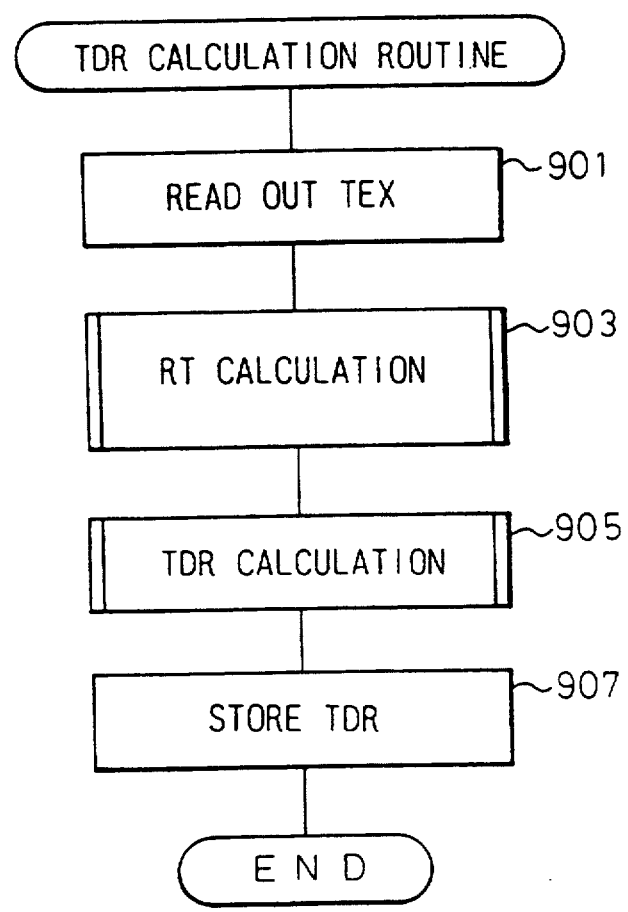
FIG. 9 is a flow chart showing an embodiment of the routine for determining the value of the parameters used in the routine of FIGS. 5A and 5B.

FIG. 9 shows the routine for adjusting the rich delay time TDR in order to achieve the length of the rich air-fuel ratio period in FIG. 8. This routine is performed by the engine control circuit 10 in FIG. 1 at predetermined intervals, for example, 512 ms.

When the routine in FIG. 9 starts, at step 901, the exhaust gas temperature data THW is read from the RAM 105 of the control circuit 10. Since the exhaust gas temperature sensor is disposed on the exhaust passage 14 immediately downstream of the $NO_x$ absorbent 16, the exhaust temperature data THW is used as the temperature of the $NO_x$ absorbent 16 to determine the delay time TDR in this embodiment.

Then, at step 903, optimum length of the rich air-fuel ratio period RT is determined from the temperature TEX in accordance with the relationships illustrated in FIG. 8. In this embodiment, the relationships shown in FIG. 8 are stored in the ROM 104 of the control circuit 10 as a numerical table, and at step 903, the value of RT is read from this table using the value TEX. The optimum length RT is varied in accordance with the types and sizes of the $NO_x$ absorbent 16, therefore, it is preferable to obtain the relationships such as shown in FIG. 8 by experiment.

At step 905, the value of the rich delay time TDR required to achieve the optimum length RT obtained by step 903 is calculated In this embodiment, the length Rt of the rich air-fuel period is expressed using the rich delay time TDR, the lean skip amount RSL and rich and lean integration amounts KIR, KIL, by, $$RT = \Delta T\{TDR + (TDR \times KIR - RSL)\} \div KIL$$

where, AT is the interval of the execution of the routine in FIGS. 5A and 5B (in this embodiment, 4 ms), the term $\{TDR+(TDR\times KIR-RSL)\} \div KIL$ corresponds to the time required for the FAF which has increased by rich integration operation (KIR) during the rich delay time TDR, to decrease to zero by lean integration operation (KIL).

Therefore, from above formula the rich delay time is expressed by, $$TDR = \{(RT/\Delta T) + (RSL/KIL)\} \div \{1 + (KIR/KIL)\}$$

In this embodiment, the values of AT, KIR, RSL, KIL are constant. Accordingly, the TDR can be expressed as, $$TDR = (RT + K1) \div K2$$

In this embodiment, the values of K1 and K2 have been calculated in advance based on the values of AT, KIR, RSL and KIL, and at step 905, the required rich delay time TDR is calculated in accordance with the above formula. Then, at step 907, the calculated value of TDR is stored in the RAM 105 of the control circuit 10, and the routine terminates.

By the routine explained above, the rich delay time TDR is adjusted in accordance with the temperature of the $NO_x$ absorbent, and, by performing the air-fuel ratio control based on the routine in FIG. 5A and 5B, the length of the rich air-fuel ratio period is adjusted in accordance with the temperature of the $NO_x$ absorbent 16.

Though the exhaust temperature TEX which is directly detected by exhaust gas temperature sensor 9 is used to calculate the rich delay time TDR, the exhaust gas temperature TEX can be detected indirectly from the operating condition (such as load condition) of the engine. Further, the accuracy of the calculation of TDR can be increased by obtaining the correlation between the exhaust gas temperature TEX and the actual temperature of the $NO_x$ absorbent by experiment and calculating the actual temperature of the $NO_x$ absorbent from the detected exhaust gas temperature using this correlation. Also, the temperature of the $NO_x$ absorbent can be measured directly by disposing a temperature sensor in the $NO_x$ absorbent. Further, though the length of the rich air-fuel ratio period is controlled by adjusting the rich delay time TDR, one of other parameters, such as rich integration amount KIR or lean skip amount RSL, or, all of the parameters such as TDR. KIR, RSL can be adjusted according to the temperature in order to achieve the optimum length of rich air-fuel ratio period.

Next, another embodiment of the present invention will be explained with reference to FIG. 10.

Figure 10:
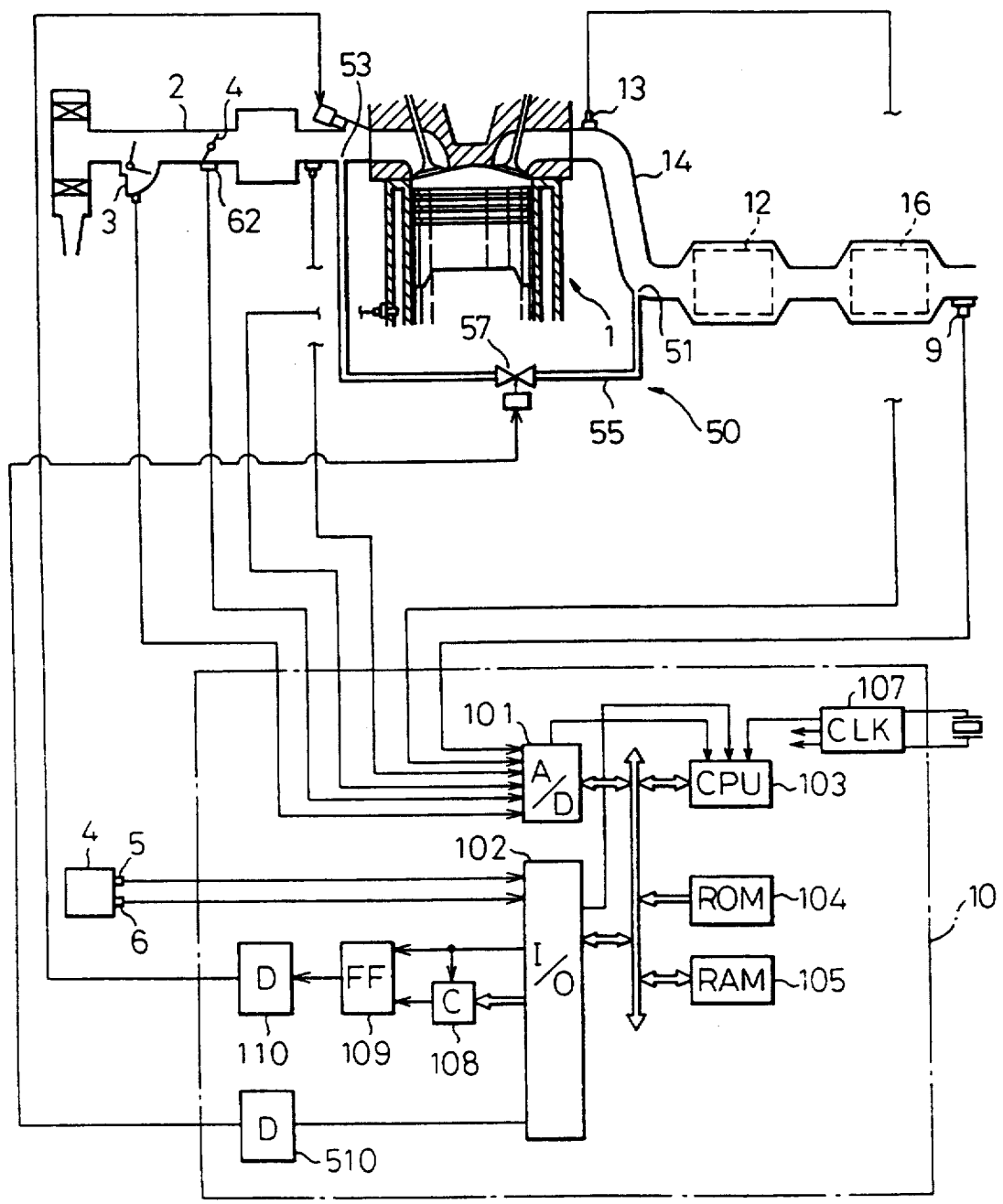
FIG. 10 is a drawing schematically illustrating an engine equipped with an exhaust gas purification device according to another embodiment of the present invention.

FIG. 10 is a drawing similar to FIG. 1, which illustrates an engine equipped with an exhaust gas purification device according to the present invention. In FIG. 10, same numerals as those in FIG. 1 designate similar elements.

In this embodiment, an EGR device 50 which recirculates a portion of the exhaust gas into the inlet air passage 2 is provided. The EGR device 50 comprises an exhaust gas intake port 51 disposed on the exhaust passage 14 upstream of the three-way catalyst 12, an exhaust gas injection port 53 for injecting exhaust gas into the inlet port of the engine 1, and an EGR passage 55 for connecting the exhaust gas intake port 51 and the exhaust gas injection port 53. Also, an EGR control valve 57, which controls the amount of the exhaust gas recirculating to the inlet port (i.e., the amount of EGR gas) is provided on the EGR passage 55. The EGR control valve is a flow control valve, for example, a solenoid operated valve, which is operated by the driving pulse signal fed from the control circuit 10 via a driving circuit 510. The control circuit 10 controls the amount of the exhaust gas flow in the EGR passage 55 by adjusting the duty ratio of the driving pulse fed to the solenoid actuator of the EGR control valve 57.

Further, a throttle sensor 62 for detecting a degree of opening of the throttle valve 4 is disposed on the inlet air passage adjacent to the throttle valve 4, and an inlet manifold pressure sensor 63 for detecting the vacuum pressure in the inlet manifold is disposed on the inlet manifold downstream of the throttle valve 4. The throttle sensor 62 generates a voltage signal corresponding to the degree of opening of the throttle valve 4, and the inlet manifold pressure sensor 63 generates a voltage signal corresponding to the vacuum pressure in the inlet manifold (i.e., the differential pressure between atmospheric pressure and the absolute pressure in the inlet manifold). The voltage signals from the sensors 62 and 63 are fed to the input/output interface 102 of the control circuit 10 via the A/D converter 101, and stored in the RAM 105 by a routine (not shown) performed at predetermined intervals.

In the embodiment explained above, the operating air-fuel ratio of the engine is controlled in such a manner that the air-fuel ratio oscillates between a rich air-fuel ratio and a lean air-fuel ratio, by adjusting the amount of the fuel injected from the fuel injection valve 7. On the contrary, the operating air-fuel ratio of the engine is oscillated by controlling the amount of the inlet air fed to the engine. More precisely, in this embodiment, the amount of the fuel injected from the fuel injection valve 7 is maintained at constant value determined by the operating condition of the engine, and the amount of the inlet air is oscillated by changing the amount of the EGR gas periodically in order to oscillate the air fuel ratio of the engine between a rich air-fuel ratio and a lean air-fuel ratio about the stoichiometric air-fuel ratio.

As explained before, the length of the rich air-fuel ratio period in the air-fuel ratio oscillation of the engine must be long enough to allow the $NO_x$ absorbent 16 to release the absorbed $NO_x$ completely. This causes the length of the entire cycle of the oscillation of the operational air-fuel ratio of the engine to be relatively long. In this case, if the oscillation of the operational air-fuel ratio is controlled by changing the amount of the fuel supplied to the engine, fluctuation of the output torque of the engine occurs in accordance with the changes in the amount of the fuel supplied to the engine. Therefore, in the embodiment shown in FIGS. 5A, 5B, and 9, the fluctuation of the output torque of the engine occurs at relatively long intervals. When the fluctuation of the engine output torque occurs at relatively long intervals, the driver of the vehicle feels larger output torque fluctuation than the torque fluctuation of short intervals, and driveability of the vehicle becomes worse.

On the other hand, instead of the amount of the fuel, the operational air-fuel ratio of the engine can be changed by adjusting the amount of the inlet air flow. In this case, since the amount of the fuel supplied to the engine is not changed, the fluctuation of the output torque of the engine due to the change of the air-fuel ratio is relatively small, and the degree of deterioration of the driveability is relatively small even if the length of the cycle of the air-fuel ratio oscillation becomes longer.

Considering this point, in this embodiment, the amount of the inlet air flow is controlled by adjusting the amount of the EGR gas in such a manner that the operational air-fuel ratio of the engine oscillates between a rich air-fuel ratio and a lean air-fuel ratio at relatively long intervals.

In this embodiment, the amount of the fuel injected from the fuel injection valve 7 is determined in accordance with the inlet manifold vacuum Pm and the engine speed Ne, and the amount of the injected fuel is not changed periodically. Instead of the amount of the fuel injection, the amount of the EGR gas flow is controlled by the EGR control valve 57 so that the amount of the EGR gas flow oscillates around the center value determined by the degree of opening of the throttle valve TH and the engine speed Ne.

When the amount of the EGR gas recirculating to the inlet port increases, the amount of the fresh air sucked by the engine decreases by the amount of the EGR gas flow even if the degree of opening of the throttle valve 4 is not changed. Since the oxygen concentration of the EGR gas is low compared to the oxygen concentration of the fresh air, when the amount of the EGR gas is increased, the air-fuel ratio of the engine becomes lower (i.e., becomes richer). Therefore, the air-fuel ratio of the engine becomes lower without changing the degree of opening of the throttle valve 4. In this embodiment, the amount of the fuel injected from the fuel injection valve 7 is determined in such a manner that the operational air-fuel ratio becomes lean compared to the stoichiometric air-fuel ratio when the EGR gas is not supplied to the engine. Therefore by adjusting the exhaust gas flow using the EGR control valve 57, the operating air-fuel ratio of the engine can be controlled so that the air-fuel ratio oscillates between the rich air-fuel ratio side and the lean air-fuel ratio side at relatively long intervals.

Figure 11:
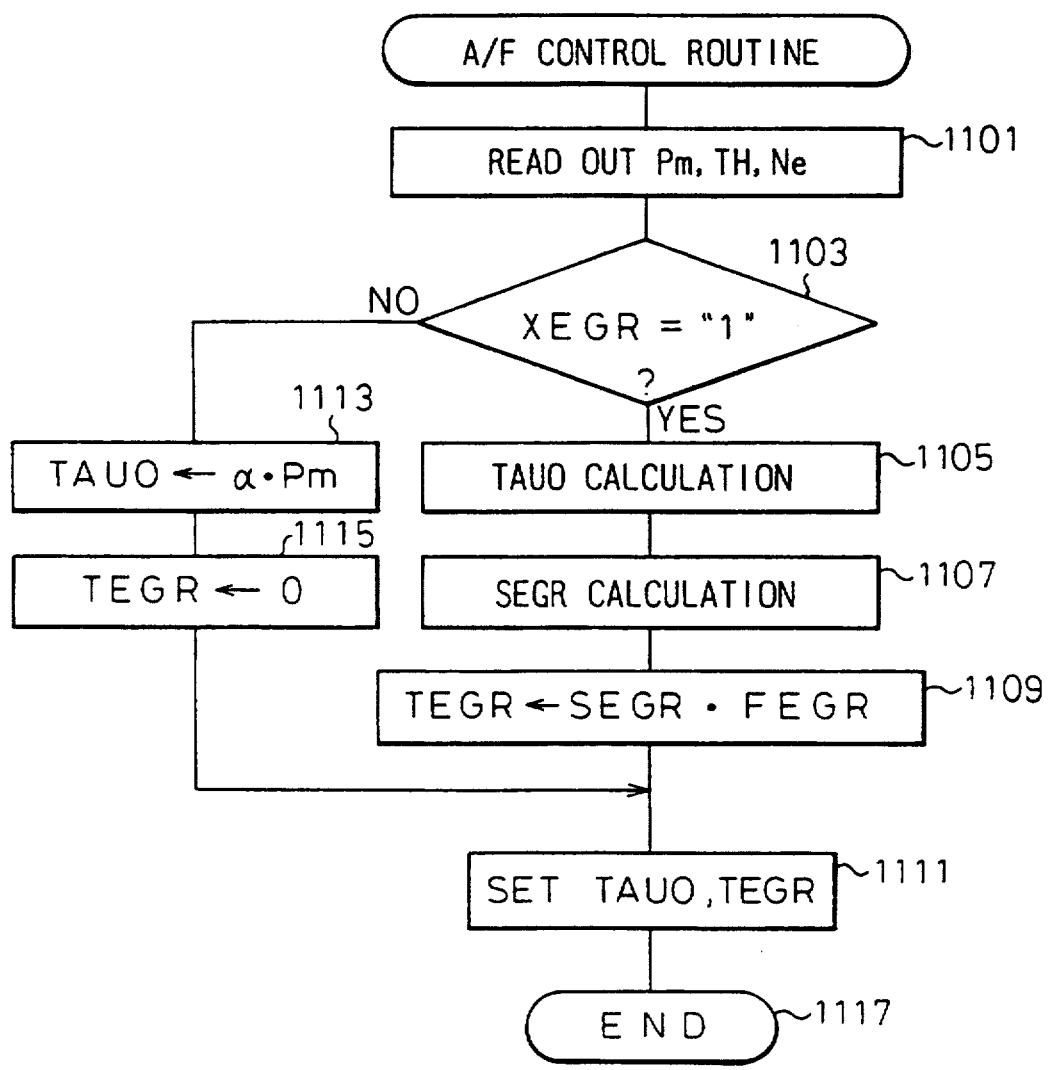
FIGS. 11, 14A and 14B are flow charts showing the air-fuel ratio control of the engine in FIG. 10.

FIG. 11 is a flow chart showing the control operation of the air-fuel ratio of the engine according to the present invention. This routine is performed by the control circuit 10 at predetermined intervals such as at every 360 degree rotation of the crankshaft of the engine.

When the routine starts in FIG. 11, at step 1101, the operating data such as inlet manifold vacuum Pm, the degree of opening TH of the throttle valve 4, and engine speed Ne are read from the RAM 105 of the control circuit 10. Then, at step 1103, it is determined whether or not an EGR flag XEGR is set (i.e., XEGR=1). The flag XEGR is set by another routine (not explained) performed by the control circuit 10 when conditions for exhaust gas recirculation are satisfied. The conditions for the exhaust gas recirculation are, for example, the temperature of the coolant of the engine is higher than a predetermined value, the operating condition of the engine is not in a transient condition (for example, the load of the engine is not changing by large amount), the engine is not operating in a full-load or idle condition.

When all of these conditions are satisfied, the flag XEGR is set to be 1, and if any one of these conditions is not satisfied, the flag XEGR is reset (XEGR=0).

If the value of the flag EGR is 1 at step 1103, the routine proceeds to step 1105, which calculates a basic fuel injection amount TAUO. TAUO is a fuel injection amount required to obtain the stoichiometric air-fuel ratio under the condition in which the degree of opening of the EGR control valve 57 is set at a value SEGR in order to obtain a basic EGR amount. TAUO is calculated in accordance with the inlet manifold vacuum Pm and the engine speed Ne read from the RAM 105 at step 1101.

Figure 12A:
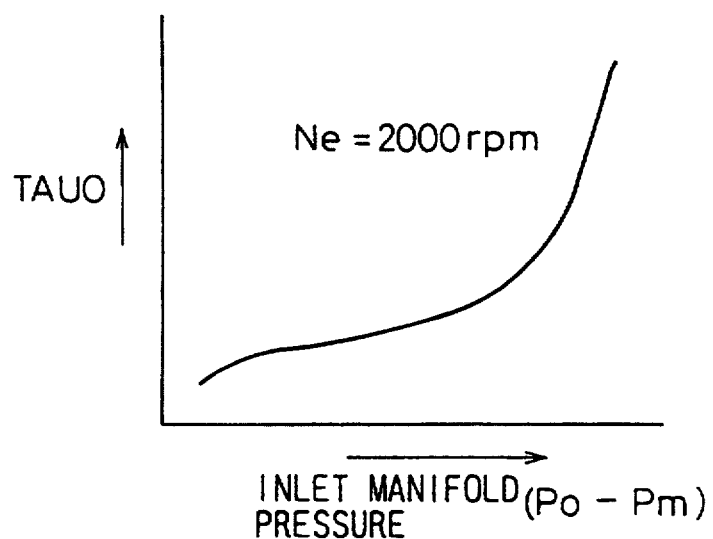
FIGS. 12A and 12B show examples of the setting of the fuel injection amount in the routine of FIG. 11.
Figure 12B:
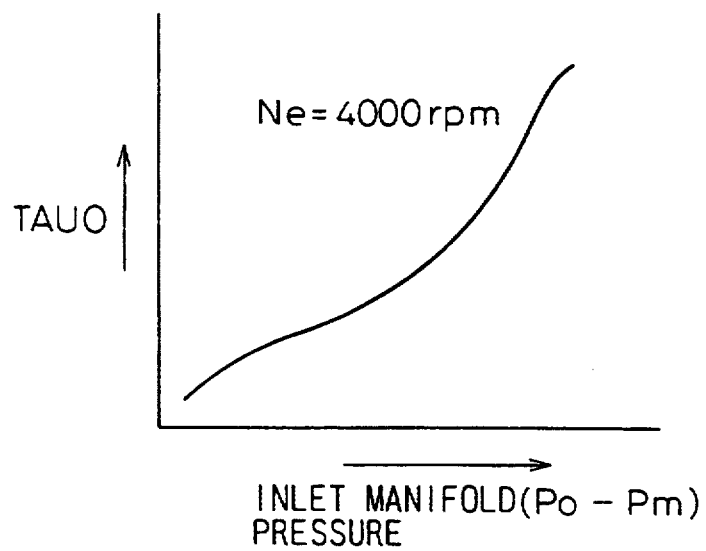

FIGS. 12A and 12B are examples showing relationships of TAUO, Pm, and Ne. The vertical axis in FIGS. 12A and 12B indicates TAUO, and horizontal axis indicates an absolute pressure in the inlet manifold (i.e., atmospheric pressure P0 minus inlet the cases in which the engine speed Ne is 2000 rpm and 4000 rpm, respectively. In this embodiment, the value of TAUO is determined for various engine speed conditions, by experiment, and stored in the form of numerical tables in the ROM 104 of the control circuit 10. At step 1105, TAUO is determined from these numerical table based on Pm and Ne obtained at step 1101.

As shown in FIGS. 12A and 12B, when the engine speed Ne is constant, the basic fuel injection amount TAUO increases along a curve which bulges downward, as the absolute pressure in the inlet manifold increases; and when the manifold pressure Pm is constant, TAUO also increases as the engine speed Ne increases. This is because, in contrast to the fact that the basic EGR amount is determined in accordance with the degree of opening TH of the throttle valve and the engine speed Ne as explained later in FIGS. 13A and 13B, the TAUO is determined in such a manner that the stoichiometric air-fuel ratio is obtained when the basic EGR amount of the EGR gas is supplied to the engine.

Figure 13A:
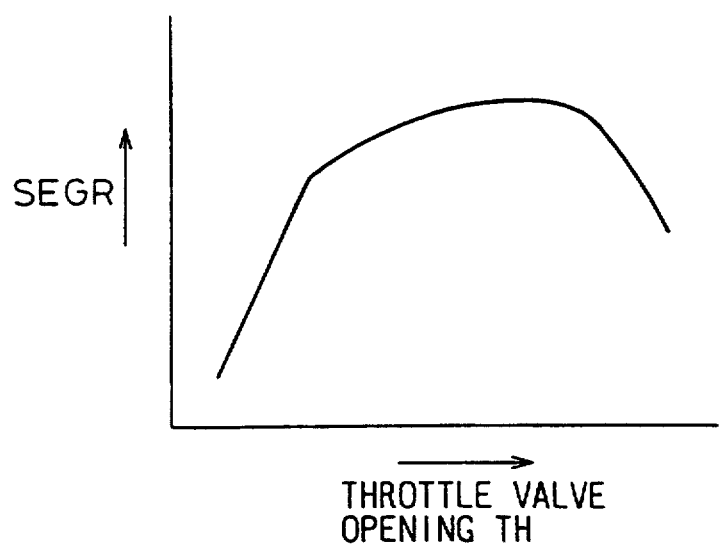
FIGS. 13A and 13B show examples of the setting of the degree of opening of the EGR control valve in the routine of FIG. 11.
Figure 13B:
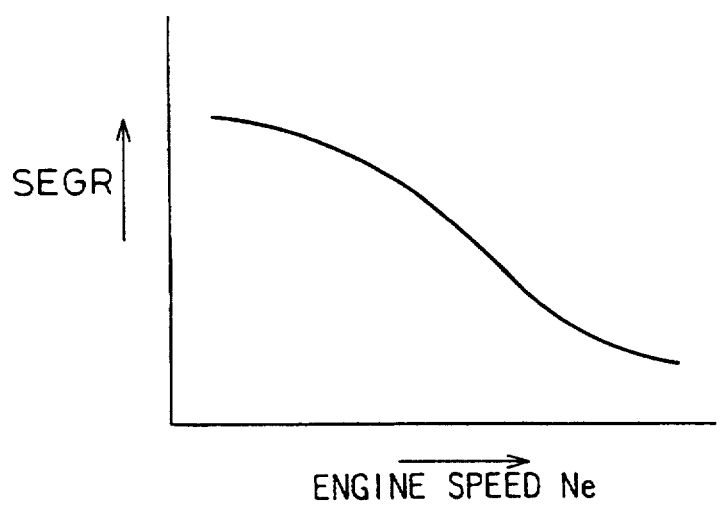

Then, at step 1107, the basic amount SEGR of the degree of opening of the EGR control valve 57 (which corresponds to the basic EGR amount) is calculated. FIGS. 13A and 13B show examples of the setting of SEGR. FIG. 13A shows the relationship between SEGR and the degree of opening Th of the throttle valve when the engine speed Ne is kept constant, and FIG. 13B shows the relationship between SEGR and Ne when TH is kept constant.

As seen from FIG. 13A, when the engine speed Ne is constant, the basic amount SEGR increases as the degree of opening TH of the throttle valve increases when TH is relatively small, but decreases as the degree of opening TH increases when TH exceeds a certain value in order to increase the output of the engine in high load operating condition by reducing the amount of EGR gas.

Further, as seen from FIG. 13B, when the opening TH of the throttle valve is constant, SEGR is reduced as the engine speed Ne increases in order to maintain good combustion of the engine in the high speed operating condition. In this embodiment, the value of optimum SEGR is determined for various engine speed Ne and throttle valve opening TH, by experiment, and stored as a form of numerical tables in the ROM 104 of the control circuit 10. At step 1107, SEGR is determined from these numerical table based on TH and Ne obtained at step 1101.

Then, at step 1109, an actual setting TEGR (actual setting of the amount of EGR gas) of the degree of opening of the EGR control valve 57 is calculated by, $$TEGR = SEGR \times FEGR$$

Then the values of SEGR and TEGR are stored in the RAM 105 of the control circuit 10, and the routine terminates at step 1117.

When the value of TAUO is stored in the RAM 105, the amount of the fuel corresponding to the value of TAUO is injected from the fuel injection valve 7, and when the value of TEGR is stored in RAM 105, the duty ratio of the driving pulse signal of the EGR control valve 57 is set in accordance with the value of TEGR by another routine performed by the control circuit in such a manner that the degree of opening of the EGR control valve becomes TEGR.

Figure 14A:
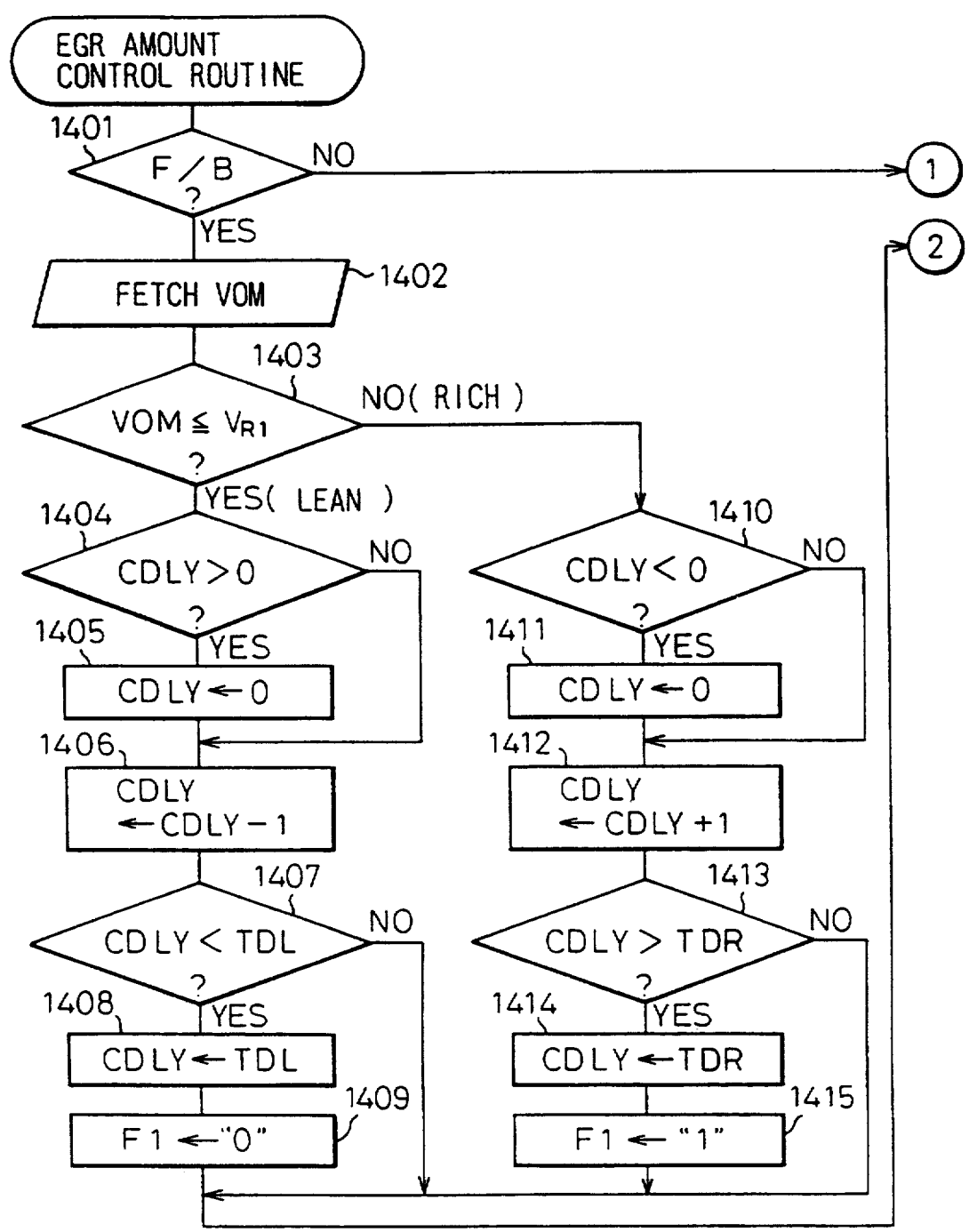
Figure 14B:
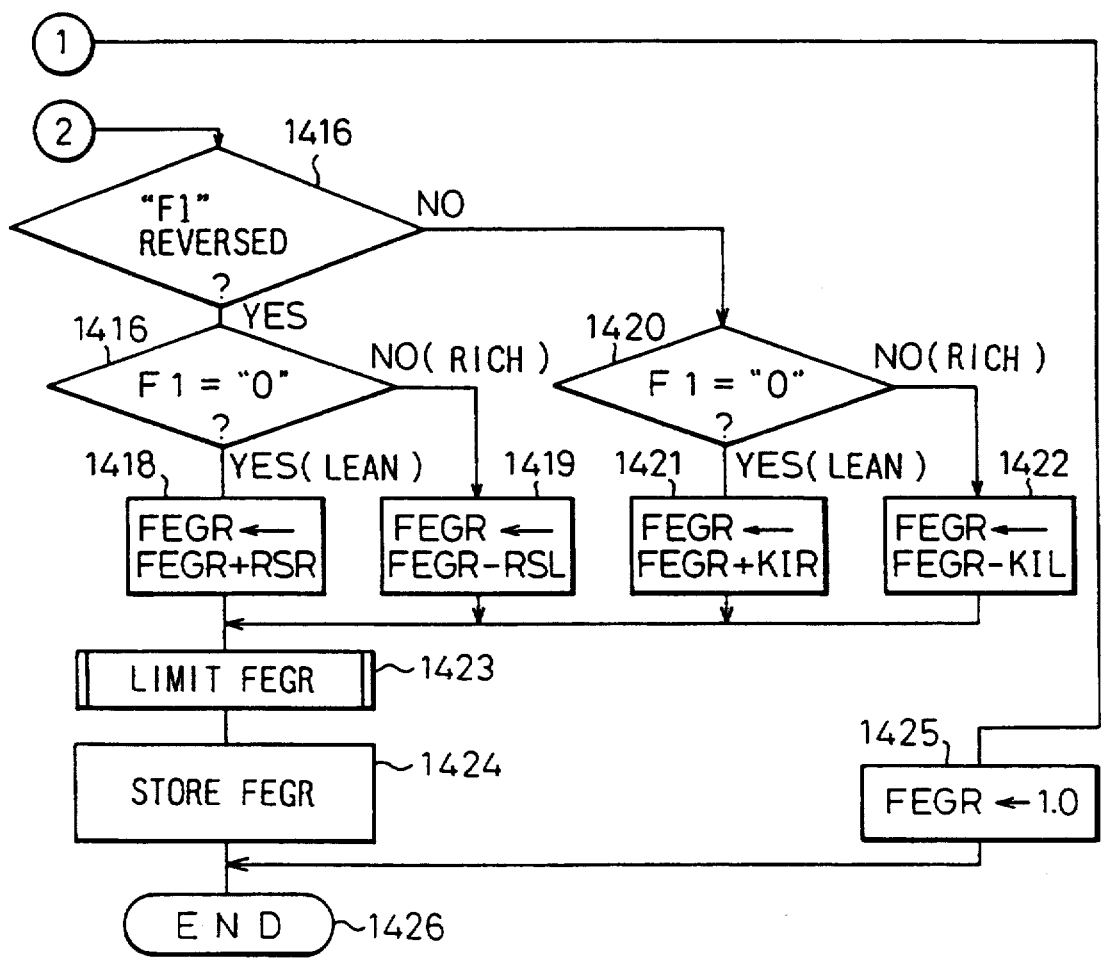

FEGR which appears in the above formula is an EGR correction factor. Similar to the air-fuel ratio correction factor in FIG. 5B, FEGR is used in order to control the operational air-fuel ratio of the engine in such a manner that it oscillates between a rich air-fuel ratio and a lean air-fuel ratio periodically. The correction factor FEGR is also calculated in accordance with the output of the $O_2$ sensor 13 disposed on the exhaust passage 14 by a routine shown in FIGS. 14A and 14B by the control circuit 10. Since the routine in FIGS. 14A and 14B is nearly the same as the routine in FIGS. 5A and 5B, further explanation is not necessary.

Returning to the explanation of FIG. 11, at step 1103, if the value of the flag XEGR is 0, the routine proceeds to steps 1113 and 1115. In this case, since the EGR gas is not supplied to the engine, the basic fuel injection amount TAUO is determined from the inlet manifold vacuum Pm only in order to obtain the stoichiometric air-fuel ratio under the condition in which EGR gas is not supplied. For example, TAUO is calculated at step 1113 by $$TAUO = \alpha \times Pm$$

Then, at step 1115, the setting TEGR of the EGR control valve 57 is set at zero (fully closed), and the values of TAUO and TEGR are stored in the RAM 105. By these steps, the air-fuel ratio of the engine is maintained at stoichiometric air-fuel ratio, and the EGR gas is shut off.

AS explained above, the routines in FIGS. 11, 14A and 14B, when the condition for EGR operation is satisfied, control the EGR amount in such a manner that the EGR amount oscillates about the basic EGR amount as the center value, and the air-fuel ratio of the engine oscillates between a rich air-fuel ratio and a lean sir-fuel ratio about the stoichiometric air-fuel ratio as the center value. In this embodiment, the parameters TDR, TDL, KIR, KIL, RSL and RSL are determined so that the period of the cycle of the oscillation of the air-fuel ratio becomes relatively long (for example, 2 to 7 seconds).

Next, another embodiment of the exhaust gas purification device according to the present invention is explained with reference to FIG. 15.

Figure 15:
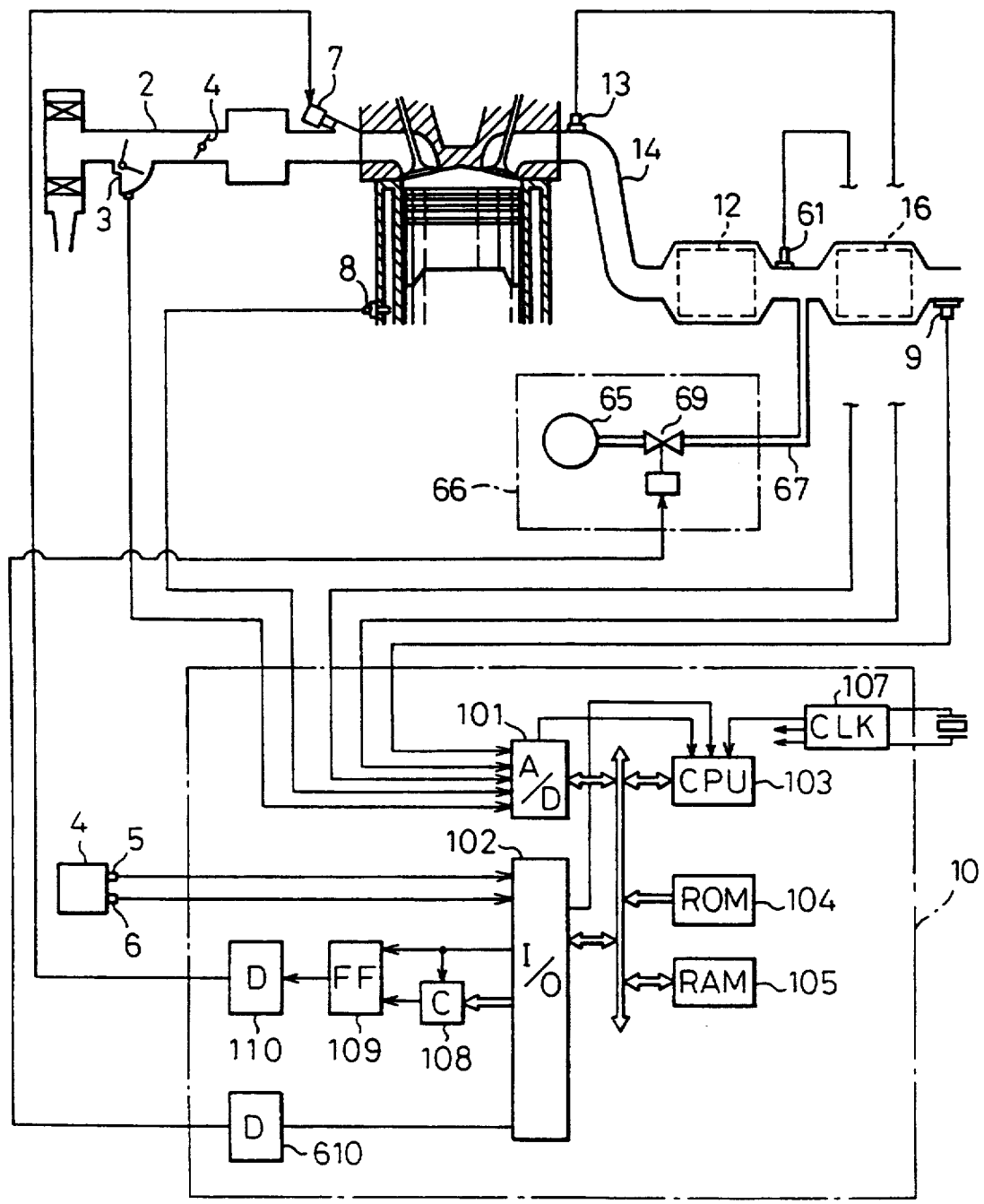
FIG. 15 is a drawing schematically illustrating an engine equipped with an exhaust gas purification device according to another embodiment of the present invention.

FIG. 15 is a drawing similar to FIG. 1, which illustrates an engine equipped with an exhaust gas purification device according to the present invention. In FIG. 15, same numerals as those in FIGS. 1 and 10 designate similar elements.

In this embodiment, another $O_2$ sensor 61 is provided on the exhaust passage 14 downstream of the three-way catalyst 12. Further, in this embodiment, a secondary air supply system 66 for injecting secondary air into the exhaust passage between the $O_2$ sensor 61 and the $NO_x$ absorbent 16 is provided.

The secondary air supply system 66 comprises a pressurized air source 65 such as an air pump and an air tank, an air conduit 67 for injecting the air from the pressurized air source 65 into the exhaust passage between the $O_2$ sensor 61 and the $NO_x$ absorbent 16. Further, a secondary air control valve 69 is provided on the air conduit 67. In this embodiment, the secondary air control valve 69 is a shut off valve which opens and closes in accordance with a control signal from the control circuit 10, however, a flow control valve which can adjust flow rate continuously can be used as the secondary air control valve 69.

As explained in FIG. 3, the $NO_x$ absorbent requires oxygen to absorb $NO_x$ in the exhaust gas. Therefore, the capacity of the $NO_x$ absorbent to absorb $NO_x$ increases as the oxygen concentration in the exhaust gas increases (i.e., as the air-fuel ratio of the exhaust gas increases). Accordingly, in order to increase the $NO_x$ absorbent's capacity, it is preferable that the amplitude of the oscillation of the air-fuel ratio of the engine, especially the amplitude in the lean air-fuel ratio side is set as large as possible. However, in case of the engine illustrated in FIG. 1, which controls the operating air-fuel ratio by changing the fuel injection amount, it is not practical to set the amplitude of the oscillation of the operating air-fuel ratio too large, since the fluctuation of the output torque of the engine becomes too large, and the driveability of the vehicle is reduced. On the other hand, in case of the engine in FIG. 10 which controls the operating air-fuel ratio by changing the amount of the EGR gas, the amount of the EGR gas cannot be increased beyond a certain value at which a misfiring occurs. Therefore, in this case also it is difficult to set the amplitude of the oscillation of the operating air-fuel ratio sufficiently large.

As explained above, in the engine in which the operating air-fuel ratio oscillates between a rich air-fuel ratio and a lean air-fuel ratio around the center value of the stoichiometric air-fuel ratio, it is difficult to increase the capacity of the $NO_x$ absorbent to the maximum extent, since the air-fuel ratio of the exhaust gas is not sufficiently lean even when the operating air fuel ratio swings to lean air-fuel ratio side.

In order to solve this problem, and to increase the capacity of the $NO_x$ absorbent 16 to maximum extent, the secondary air supply system 66 in this embodiment supplies secondary air to the $NO_x$ absorbent 16 when the air-fuel ratio of the exhaust gas flowing into the $NO_x$ absorbent 16 becomes lean. Namely, in this embodiment the air fuel ratio of the exhaust gas flowing into the $NO_x$ absorbent 16 becomes leaner than the operating air-fuel ratio of the engine during the lean air-fuel ratio period.

In this embodiment, the operating air-fuel ratio of the engine is controlled by the method explained in FIGS. 5A, 5B and 10 (i.e., the fuel injection amount), or FIGS. 11 14A and 14B (EGR amount), in such a manner that the operating air-fuel ratio oscillates between a rich air-fuel ratio and a lean air-fuel ratio about the center value of the stoichiometric air-fuel ratio. Further, the control circuit 10 monitors the output signal of the $O_2$ sensor 61, and supplies the secondary air to the $NO_x$ absorbent 16 by opening the secondary air control valve 69, when the output signal of the $O_2$ sensor 61 is lean condition (i.e., the air-fuel ratio of the exhaust gas discharged from the three-way catalyst 12 is lean). By this operation, the air-fuel ratio of the exhaust gas flowing into the $NO_x$ absorbent 16 becomes leaner, and the capacity of the $NO_x$ absorbent 16 increases.

Further, when the output signal of the $O_2$ sensor 61 is lean, the control circuit 10 shuts off the secondary air control valve 69. By this operation, the rich air-fuel ratio condition of the exhaust gas flowing into the $NO_x$ absorbent is not affected by the secondary air. Thus, the releasing of the $NO_x$ absorbed in the $NO_x$ absorbent is not affected by the secondary air.

Figure 16:
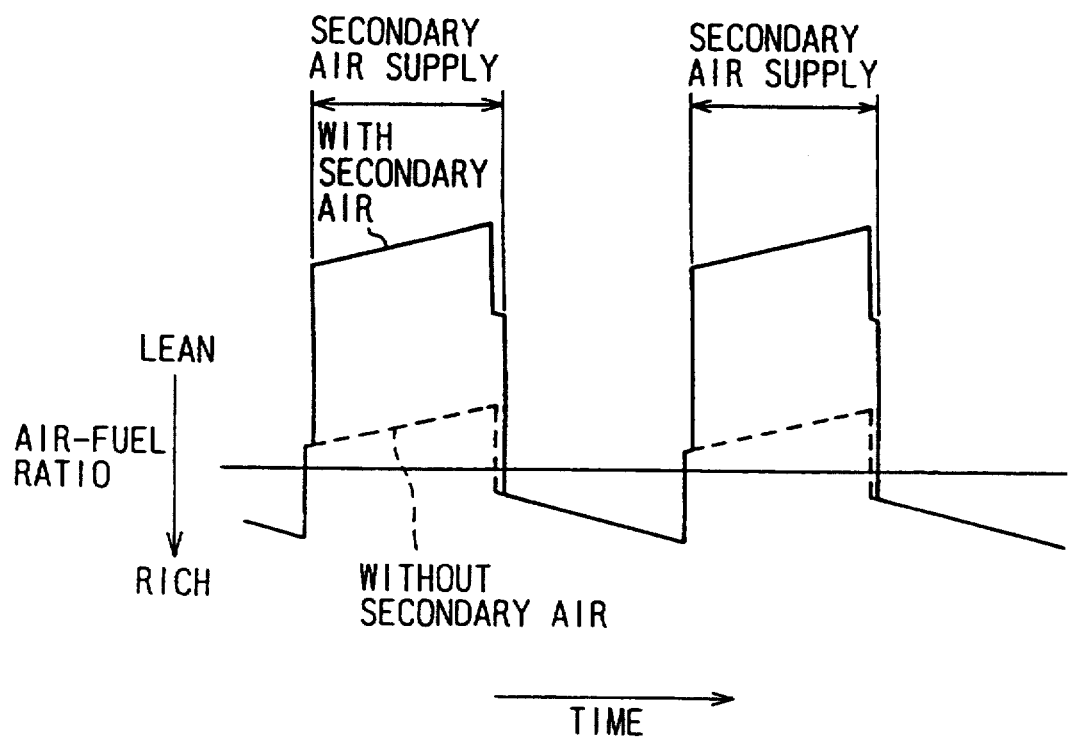
FIG. 16 is a timing diagram explaining the operation of the exhaust gas purification device in FIG.

FIG. 16 is a timing diagram showing the change in the air-fuel ratio of the exhaust gas flowing into the $NO_x$ absorbent 16 in this embodiment. As seen from FIG. 16, by supplying the secondary air to the $NO_x$ absorbent during the air-fuel ratio of the exhaust gas is on the lean side compared to the stoichiometric air-fuel ratio, the air-fuel ratio of the exhaust gas flowing into the $NO_x$ absorbent 16 becomes sufficiently lean, and the capacity of the $NO_x$ absorbent can be increased without affecting the driveability of the vehicle and the releasing operation of the $NO_x$ by the $NO_x$ absorbent 16.

In this embodiment, a shut off valve, which either fully opens or fully closes is used as the secondary air control valve 69. Namely, the amount of the secondary air supplied to the $NO_x$ absorbent 16 is almost constant regardless of the operating condition of the engine. However, the amount of the exhaust gas flow changes according to the operating condition (such as load and speed) of the engine, and the amount of the secondary air required for achieving an optimum lean air-fuel ratio condition of the exhaust gas flowing into the $NO_x$ absorbent actually varies according to the operating condition of the engine. Therefore, instead of the shut off valve, a flow control valve which can adjust the air flow continuously may be used as the secondary air control valve 69, in order to control the amount of the secondary air in accordance with the operating condition of the engine so that the maximum capacity of the $NO_x$ absorbent is assured in all operating conditions.

Further, though the secondary air is controlled by the output signal of the $O_2$ sensor 61 disposed on the exhaust passage downstream side of the three-way catalyst 12, it is possible to use the $O_2$ sensor 13 disposed on upstream side of the three-way catalyst 12 instead of the $O_2$ sensor 61 to control the supply of the secondary air.

As explained above, according to the present invention, by disposing the $NO_x$ absorbent on the exhaust passage downstream of the three-way catalyst, the pollutants HC, CO and $NO_x$, especially $NO_x$ in the exhaust gas of the engine which is controlled in such a manner that the operating air-fuel ratio oscillates between a rich air-fuel ratio and a lean air-fuel ratio about the center value of the stoichiometric air-fuel ratio, can be effectively purified.

Although the present invention has been described with reference to specific embodiments chosen for the purpose of illustration, it should be understood that numerous modification could be applied by those skilled in the art without departing from the basic concept and scope of the present invention.

I claim:

1. An exhaust gas purification device for an internal combustion engine having an inlet air passage and an exhaust passage, said device comprising:

an air-fuel ratio controlling means for controlling an operating air-fuel ratio of said engine in most of the operating region thereof in such a manner that the air-fuel ratio of the engine oscillates periodically between a rich air-fuel ratio and a lean air-fuel ratio about a stoichiometric air-fuel ratio as the center of the oscillation;

a three-way reducing and oxidizing catalyst disposed in said exhaust passage;

an $NO_x$ absorbent disposed in said exhaust passage of the engine downstream of said three-way catalyst, said $NO_x$ absorbent absorbing an $NO_x$ component in the exhaust gas when the air-fuel ratio of the exhaust gas flowing into said $NO_x$ absorbent is lean, and releasing the absorbed $NO_x$ when the oxygen concentration in the exhaust gas becomes lower.

2. An exhaust gas purification device according to claim 1, wherein said air-fuel ratio control means controls the operating air-fuel ratio of the engine by controlling the amount of the fuel fed to the engine.

3. An exhaust gas purification device according to claim 1, wherein said air-fuel ratio control means controls the operating air-fuel ratio of the engine by controlling the amount of intake air fed to the engine.

4. An exhaust gas purification device according to claim 3, wherein said air-fuel ratio control means comprises an exhaust gas recirculating means for recirculating the exhaust gas of the engine to the inlet air passage of the engine and a recirculation control means for controlling the amount of the exhaust gas recirculating to the intake passage, to thereby control the amount of the intake air fed to said engine.

5. An exhaust gas purification device according to claim 1, wherein said air-fuel ratio control means further comprises a temperature detecting means for detecting the temperature of said $NO_x$ absorbent, and controls the length of the period in the air-fuel ratio oscillation in which the air-fuel ratio of the engine is controlled on rich air-fuel ratio side compared to the stoichiometric air-fuel ratio in accordance with the temperature of the $NO_x$ absorbent.

6. An exhaust gas purification device according to claim 1, which further comprises an exhaust gas air-fuel ratio control means for controlling the air-fuel ratio of the exhaust gas flowing into the $NO_x$ absorbent separately from the operating air-fuel ratio of the engine, and further increases the air-fuel ratio of the exhaust gas flowing into said $NO_x$ absorbent when the air-fuel ratio of said exhaust gas flowing into the $NO_x$ absorbent is lean.

7. An exhaust gas purification device according to claim 6, wherein said exhaust gas air-fuel ratio control means comprises a means for introducing secondary air into the exhaust passage upstream of the $NO_x$ absorbent, and increases the air-fuel ratio of the exhaust gas flowing into the $NO_x$ absorbent by introducing the secondary air into the exhaust passage upstream of the $NO_x$ absorbent.

* * * * *

UNITED STATES PATENT AND TRADEMARK OFFICE
CERTIFICATE OF CORRECTION

PATENT NO. : 5,448,887
DATED : September 12, 1995
INVENTOR(S) : Shinichi TAKESHIMA It is certified that error appears in the above-indentified patent and that said Letters Patent is hereby corrected as shown below:

IN THE ABSTRACT: Line 25: change "passes" to --pass--.

| Column | Line | |
|---|---|---|
| 1 | 24 | Change "in" to --is for--. |
| 2 | 44 | Change "percents)." to --percent).--. |
| 2 | 45 | After "engines" change "which" to --in which the--. |
| 3 | 18 | Change "for" to --to--. |
| 3 | 31 | Change "a" to --an--. |
| 3 | 55 | After "FIG." insert --15--. |
| 4 | 62 | Change "Constructed" to --constructed--. |
| 6 | 58 | Change "metal" to --metals--. |
| 7 | 21 | Change "$O_2^-$ or $O2-$" to --$O_2^-$ or $O^{2-}$--. |
| 7 | 40 | Change "component" to --components--. |

UNITED STATES PATENT AND TRADEMARK OFFICE
CERTIFICATE OF CORRECTION

PATENT NO. : 5,448,887
DATED : September 12, 1995
INVENTOR(S) : Shinichi TAKESHIMA It is certified that error appears in the above-indentified patent and that said Letters Patent is hereby corrected as shown below:

| Column | Line | Corrections |
|---|---|---|
| 8 | 40 | Change "passes" to --pass--. |
| 10 | 18 | Change "On" to --On--. |
| 11 | 9 | Change "A/F" to --A/F'--. |
| 11 | 13 | Change "A/F" to --A/F'--. |
| 11 | 18 | Change "A/F" to --A/F'--. |
| 16 | 31 | After "inlet" insert --manifold vacuum Pm). Further, FIGS. 12A and 12B show--. |
| 17 | 6 | Change "speed" to --speeds--. |
| 17 | 7 | Change "opening" to --openings--. |
| 19 | 29 | Change "during" to --while--. |

Signed and Sealed this

Twentieth Day of February, 1996

Attest:

BRUCE LEHMAN

Attesting Officer

Commissioner of Patents and Trademarks